(12) United States Patent
Anderson et al.

(10) Patent No.: US 8,393,688 B2
(45) Date of Patent: Mar. 12, 2013

(54) THREE-WAY VALVE SIMULATOR FOR A VEHICLE BRAKE SERVO WITH PLAY COMPENSATION

(75) Inventors: Chris Anderson, Paris (FR); Bastien Cagnac, Cramoisy (FR); Raynald Sprocq, Esbly (FR)

(73) Assignee: Robert Bosch GmbH, Stuttgart (DE)

( * ) Notice: Subject to any disclaimer, the term of this patent is extended or adjusted under 35 U.S.C. 154(b) by 491 days.

(21) Appl. No.: 12/687,300

(22) Filed: Jan. 14, 2010

(65) Prior Publication Data
US 2010/0176654 A1    Jul. 15, 2010

(30) Foreign Application Priority Data

Jan. 15, 2009   (FR) ..................................... 09 00176

(51) Int. Cl.
*B60T 13/00*   (2006.01)
(52) U.S. Cl. .................... 303/114.1; 188/152; 303/114.3
(58) Field of Classification Search .................. 91/369.1, 91/376 R; 60/556; 303/114.1–114.3; 188/152
See application file for complete search history.

(56) References Cited

U.S. PATENT DOCUMENTS

| 7,104,612 B2* | 9/2006 | Terazawa et al. .......... 303/113.4 |
| 2005/0236892 A1* | 10/2005 | Kusano ....................... 303/116.1 |
| 2010/0154408 A1* | 6/2010 | Anderson et al. ............... 60/556 |
| 2010/0181152 A1* | 7/2010 | Anderson et al. ............. 188/152 |
| 2010/0269683 A1* | 10/2010 | Anderson et al. ............ 91/369.1 |

FOREIGN PATENT DOCUMENTS

| FR | 2895958 | 7/2007 |
| FR | 2918332 | 1/2009 |
| WO | WO 2007/080106 | * 7/2007 |

OTHER PUBLICATIONS

FR0900176 International Search Report and Written Opinion.

* cited by examiner

*Primary Examiner* — Christopher Schwartz
(74) *Attorney, Agent, or Firm* — Michael Best & Friedrich LLP

(57) ABSTRACT

The three-way valve simulator (100) for a vehicle brake servo comprises: a control piston (106); and a reaction piston (140) remote from the control piston when the simulator is at rest. It is arranged such that the control piston, under the effect of a command transmitted from outside the simulator, can be moved over a predetermined travel in the direction of the reaction piston without transmitting stress to the latter.

9 Claims, 13 Drawing Sheets

THREE-WAY VALVE SIMULATOR FOR A VEHICLE BRAKE SERVO WITH PLAY COMPENSATION

BACKGROUND OF THE INVENTION

The invention relates to braking systems for vehicles, provided with a three-way valve simulator and with a brake servo.

For example, document FR-2 895 958 discloses such a system which comprises: a control device serving to receive a command sent by the driver from the brake pedal; a simulator for sending into the pedal a sensation adapted to the driver; a brake servo controlled by a three-way valve of the simulator; and a master cylinder whose actuation takes place with the assistance of the brake servo.

The brake servo comprises a vacuum chamber permanently connected to a vacuum source and a working chamber connected by the three-way valve sometimes to the vacuum chamber and sometimes to an air source at atmospheric pressure. The control of the three-way valve makes it possible, as a function of the pressure prevailing in the working chamber, to move the membrane of the brake servo in order to actuate the master cylinder.

However, the regulations provide that such a system allows the vehicle to brake in the event of failure of the vacuum source. In the aforementioned document, and in such a circumstance, the driver can actuate the pedal so that a rod of the control device, after compensating for an uncoupling play, directly contacts an actuating piston of the master cylinder. Thus, the driver can directly actuate this piston in order to brake the vehicle.

However, in such an operating mode, the simulator continues to provide a sensation to the pedal. Specifically, the actuation of the control device again causes the movement of a control piston of the simulator in the direction of a reaction piston and the compression of a simulation spring interposed between the two in order to oppose them from coming together. When the driver actuates the control rod in order to bring it into contact with the master cylinder piston while compensating for the uncoupling play, he must do so against the pressure of the spring. Therefore, he must provide a specific force for this purpose which consumes some of the driver's energy available for braking. Now, this energy is all the more precious since the braking system, by hypothesis, no longer provides assistance to the driver and since it is the driver himself who must therefore make the pressure in the braking circuit rise. This is therefore a disadvantage insofar as it is preferably sought to preserve under all circumstances the energy that the driver can mobilize to accomplish braking.

SUMMARY OF THE INVENTION

An object of the invention is therefore to overcome this disadvantage.

To this end, there is provided according to the invention a three-way valve simulator for a vehicle brake servo, comprising: a control piston; and a reaction piston remote from the control piston when the simulator is at rest, the simulator being arranged such that the control piston, under the effect of a command transmitted from outside the simulator, can be moved over a predetermined travel in the direction of the reaction piston without transmitting stress to the latter.

Thus, in the event of failure of the vacuum source, as long there is no interaction between the two pistons in the simulator, in particular at the start of the travel of the control piston, the driver does not stress the reaction piston and therefore does not unnecessarily consume some of his energy. He can therefore then devote more of this energy to actuating the braking system.

Preferably, the simulator will be arranged such that the uncoupling play between the rod of the control device and the piston of the master cylinder is cancelled (such that they are in contact) before completion of the predetermined travel. The system will therefore not have consumed a significant part of the driver's energy before he starts to pressurize the brake liquid circuit.

The simulator according to the invention may additionally have at least any one of the following features: it is arranged such that the control piston directly transmits a stress to the reaction piston; it comprises: an enclosure; three ducts each able to communicate with the enclosure; and a duct, termed master cylinder duct, unable to communicate with the enclosure in the simulator and arranged to transmit a fluid pressure to the reaction piston in order to move it; it comprises a rigid slide which is movable with respect to the control and reaction pistons and which is arranged to be stressed by the control and reaction pistons, the reaction piston preferably extending within the slide; it comprises a spring bearing against the slide and a casing of the simulator; it comprises a pre-load member stressed in the direction of the reaction piston by a pre-load spring when the simulator is at rest, and against which the reaction piston bears in the direction of the control piston; it is arranged such that, when the simulator is at rest, the pre-load member bears against a casing of the simulator.

Preferably, the simulator comprises: a duct, termed working duct; a duct, termed vacuum duct; and a first duct, termed atmospheric duct, the simulator being able to place the working duct in communication optionally with the vacuum duct and with the first atmospheric duct, the simulator comprising at least a second atmospheric duct and being able to place the working duct in communication with the second atmospheric duct before placing it in communication with the first atmospheric duct.

Thus, it is arranged that the intake of atmospheric air into the working chamber takes place first of all with a first flow rate, then with a second flow rate. It is thus possible to choose, during a first period, a flow rate which reduces the risks of generating disturbances. Independently of that, during the second period, once the risk of disturbance is removed, it is possible to provide another flow rate, for example a higher flow rate. Thus, a first flow rate is set up during a period where disturbances might appear before passing to a second flow rate when the risk of disturbances is removed. This better control of the air flow rate at the start of the intake of air into the working chamber prevents unwanted disturbances perceived by the driver at the pedal.

Preferably, the simulator comprises: a casing having an enclosure and three ducts each able to communicate directly with the enclosure; a slide extending in the enclosure; a spring bearing against the piston and the slide, and a duct, termed master cylinder duct, arranged to transmit a fluid pressure on the slide, independently of the control piston, such that this pressure stresses the slide in the opposite direction to the control piston.

Thus, during the initial jump phase, the control piston stresses the slide which is, moreover, driven in the same direction by the pressure which increases in the braking circuit. The driver, after supplying the engagement force, therefore no longer has to provide an additional force in order for the pressure in the braking circuit to continue to increase. All he is required to do is to move the braking member, for example the brake pedal, more in order for the pressure in the braking circuit to increase. He therefore controls the braking by modifying the travel of the pedal, but not the force which he exerts on it. The braking thus takes place, during the jump phase, with constant force. The intensity of the braking obtained is a function of the travel of the pedal but no longer of the force exerted on it. The driver's energy is therefore greatly preserved. The driver can therefore mobilize a greater degree of energy in an emergency if high-intensity braking is made necessary by the circumstances.

There is also provided according to the invention a braking system comprising: a control device; a simulator arranged to be controlled by the control device according to the invention; and a brake servo able to be controlled by the simulator and fastened rigidly to the control device such that the latter can have a configuration in which it stresses a master cylinder fastened to the brake servo without the interposition of a fluid pressure.

BRIEF DESCRIPTION OF THE DRAWINGS

Other features and advantages of the invention will become apparent from the following description of a number of embodiments given by way of nonlimiting examples with reference to the appended drawings, in which.

DETAILED DESCRIPTION

First Embodiment

Figure 1:
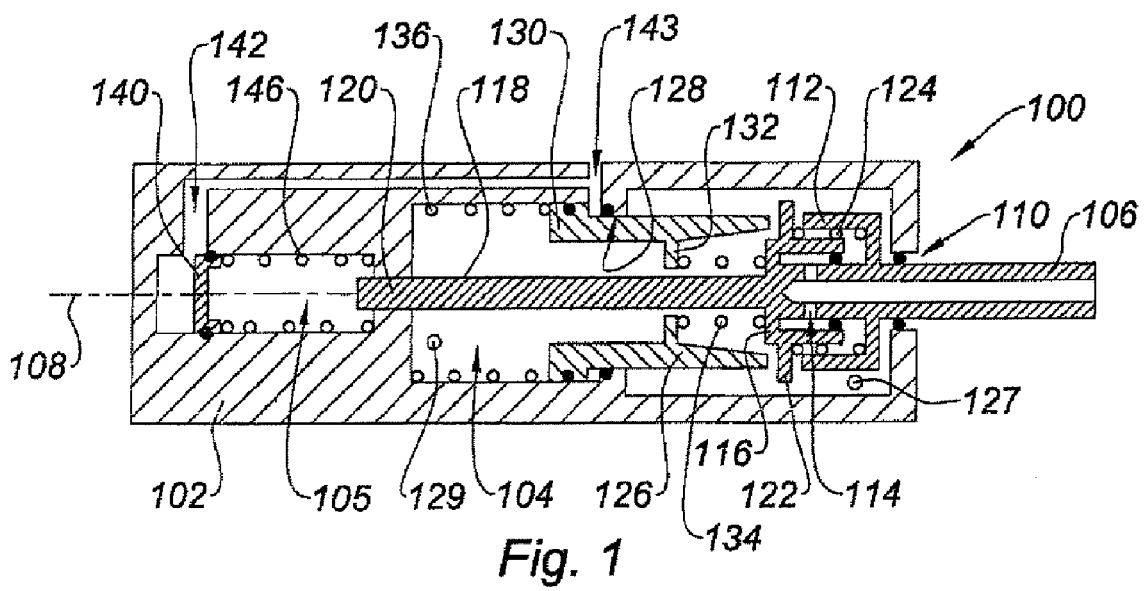
FIGS. 1 to 6 are views in axial section of a simulator according to a first embodiment of the invention, showing a number of respective steps of its operation.

We will now describe with reference to FIG. 1 a first embodiment of the simulator of the invention. This simulator forms part of a motor vehicle braking system which comprises: a device for controlling the braking that is able to receive a braking command from the driver of the vehicle; a simulator receiving the command from the control device, comprising a three-way valve and able to generate a sensation perceived at the pedal by the driver; a brake booster controlled by the three-way valve and actuating a master cylinder controlling the brake liquid pressure in the vehicle braking circuits which extend to brake members situated close to the wheels.

Such a system is known per se, for example from document FR-2 895 958.

The simulator 100 comprises a casing 102 having a rear enclosure 104 and a front enclosure 105. In the figures, by convention, the left corresponds to the front whereas the right corresponds to the rear.

The simulator comprises a control piston 106 having its longitudinal axis 108 in common with that of the simulator 100. The control piston enters the enclosure 104 through a rear opening 110 in the casing. The piston 106 has a collar 112 of which a free edge is directed toward the front. This collar has a cylindrical wall connected by a rear base to the rod of the control piston. The piston 106 has one or more orifices 114 which place a rear internal cavity of the piston, which communicates with the atmospheric air, in communication with the rear chamber 104, as will be seen further on. The piston 106 has an annular relief 116 in its central region. The piston 106 has a front rod 118 extending in the rear enclosure 104 and also in the front enclosure 105 in which it enters through an orifice 120 in an intermediate wall of the casing separating the two enclosures.

Unless indicated otherwise, all the parts are coaxial, of axis 108, with symmetry of revolution.

The simulator comprises a valve 122 interposed in the axial direction between the collar 112 and the annular relief 116. The valve is thus able to bear sometimes against the free end edge of the collar and sometimes against the rear face of the relief 116. The simulator comprises a valve spring 124 bearing against a front face of the base of the collar and against a rear face of the valve. This spring therefore urges the valve in the direction of the relief 116. This spring, like those which will be presented further on, produces bearing points along the axis 108.

The simulator 100 additionally comprises an intermediate part, in this case constituted by a slide here forming a bush 126 having a general sleeve shape. The bush has a cylindrical external face in contact with a shoulder 128 of the casing with the interposition of a seal. The bush has a radial front rim 130 extending toward the outside and in contact by its external lateral face with an internal face of the casing at the rear chamber 104, with here once more the interposition of a seal. The bush has an internal annular relief 132 against which there bears a valve spring 134, itself also bearing against a front face of the relief 116 of the control piston. The bush is traversed by the control piston.

The simulator comprises a main spring 136 or travel-pressure spring. This spring bears toward the front against a front face of the rear enclosure and toward the rear against a front end of the bush 126.

The simulator comprises a hydraulic reaction piston 140 housed in the front enclosure 105 between the orifice 120 and a duct 142 opening into the enclosure 105 in a radial direction to the axis 108.

The simulator comprises a jump spring 146 bearing toward the rear against a rear face of the front enclosure 105 and toward the front against a rear face of the piston 140.

The parts 106, 122, 126 and 140 are rigid and slidably mounted with respect to the casing 102 and with respect to one another.

The duct 142 places the front enclosure 105 in communication via an orifice 143 with the liquid circuit which can be pressurized by the master cylinder.

The control piston 106 is designed to receive, in the form of a mechanical stress, the command of the vehicle driver transmitted by a suitable means, for example the brake pedal, via the control device.

The part of the rear chamber 104 situated to the rear of the bush 126 is in communication, by means of a duct 127, with the vacuum chamber of the brake servo. The part of the rear chamber 104 situated in front of the bush 126 is in communication, by means of a duct 129, with the working chamber of the brake servo.

The valve spring 134 has the function of defining the engagement force during the braking command. It therefore acts before the so-called jump phase.

The jump spring 146 makes it possible to regulate the pressure of the liquid of the master cylinder. It also makes it possible to choose the sensation perceived at the pedal by the driver.

The main spring 136 serves to define the law which governs the pressure prevailing in the master cylinder as a function of the travel of the pedal. It therefore regulates the pressure in the master cylinder and provides a force to the driver.

Figure 6:
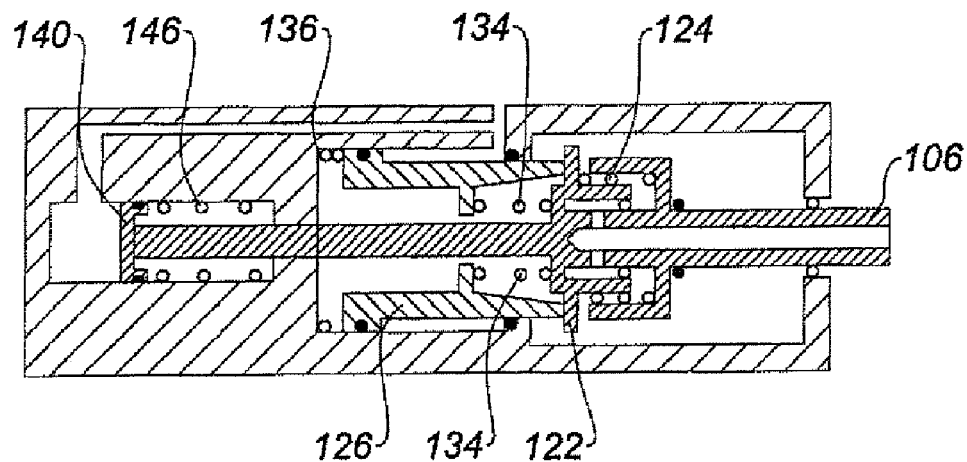

The remainder of the braking system is, for example, as described in document FR-2 895 958, in particular the embodiment in FIG. 6.

We will now present the operation of the simulator.

Figure 35:
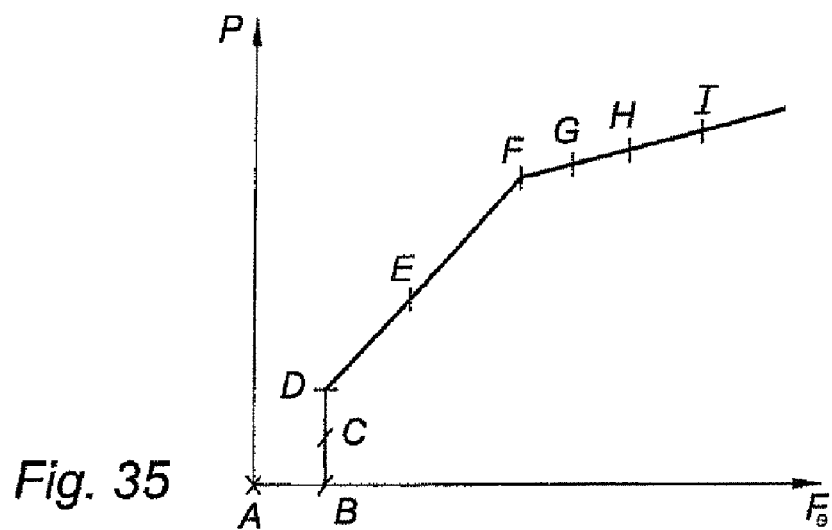
FIG. 35 is a curve illustrating the pressure in the brake circuits as a function of the inlet force applied to the simulator.

In the situation illustrated in FIG. 1, the simulator is at rest. The valve 122 bears on the relief 116 under the effect of the stress of the valve spring 124. The valve therefore shuts off the internal cavity of the control piston while not allowing any communication between the atmospheric air arriving through the rear part of the control piston and the rear enclosure 104. The valve extends moreover at a distance from the bush 126. The rear enclosure 104 of the simulator therefore causes communication between the working chamber and the vacuum chamber of the brake servo. In FIG. 35, which illustrates the change in the pressure in the master cylinder as a function of the inlet force applied to the control piston, FIG. 1 therefore corresponds to the point A situated at the intersection of the axes of the abscissas and of the ordinates.

Figure 2:
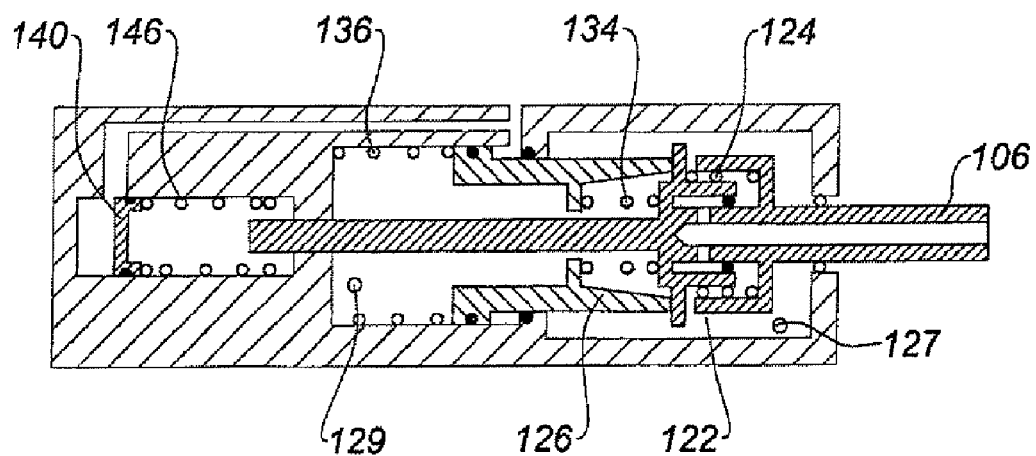

The situation in FIG. 2 corresponds to the point B in the same figure. The driver has provided an engagement force transmitted to the control device and then, via the latter, to the control piston 106. The engagement force corresponds to the distance between the points A and B. The command sent by the driver to the piston 106 has caused the latter to move toward the front, that is to say toward the left in the figure. This has been followed by a compression of the valve spring 134. The reaction provided by the latter has been perceived by the driver. Even if other members may have been involved in this perception, it is this spring which has contributed to it mainly. The valve 122 follows the piston and comes into contact with the bush 126. The bearing of the valve against the bush in FIG. 2 interrupts the communication between the working chamber and the vacuum chamber while isolating the front and rear portions of the rear enclosure 104 from one another. At this stage, the bush 126 has not moved. The piston 140 and its spring 146 have not moved either. The jump, which will allow a rise in pressure in the master cylinder, has not yet taken place and is ready to start.

Starting from the situation in FIG. 2, the continuation of the advancing movement of the control piston 106 toward the left causes the shoulder 116 to separate with regard to the valve, thereby placing the atmospheric air passing through the control piston into communication with the working chamber via the duct 129. This chamber fills with air and actuates the brake servo such that the pressure in the master cylinder starts to increase.

The duct 142 is also in communication with the rim 130 of the bush 126 on its rear face. The pressure in the master cylinder is therefore exerted toward the front, that is to say toward the left in FIG. 3, so as to move the bush in the same direction. Urged by the valve spring 124, the valve 122 itself follows the bush so as to bear on the latter.

Thus, the control piston 106 advances toward the left and separates from the valve 122. However, the increase of the pressure in the master cylinder also drives along the bush 126 toward the left and consequently the valve bearing on the latter, which therefore tends to join the relief 116 of the piston. The valve therefore maintains its equilibrium during the movement of the assembly formed by the control piston 106, the valve 122 and the bush 126.

Figure 3:
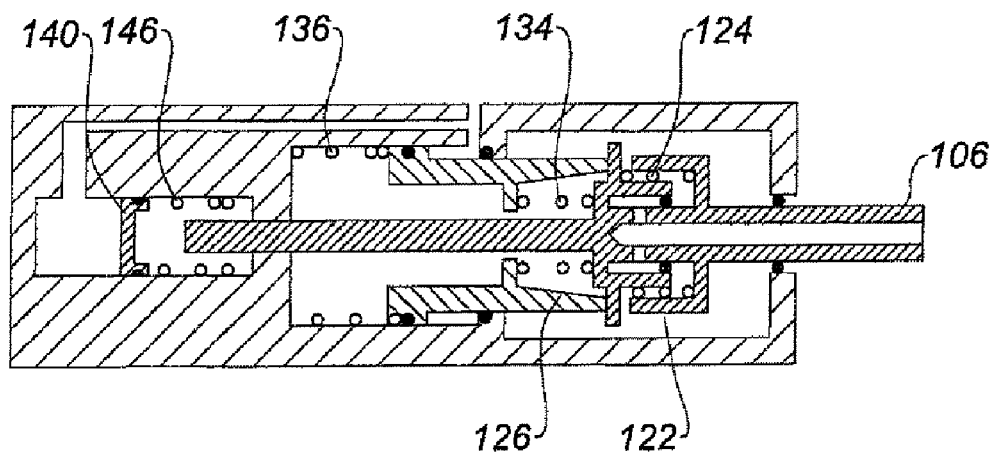

We are at FIG. 3 and at point C in FIG. 35 in the middle of the jump phase. Specifically, the driver perceives a constant force during the jump going from point B to point D. Because of the simultaneous movement of these parts, the valve spring 134 keeps a constant length and is not compressed further. However, the pressure in the master cylinder increases progressively under the effect of the brake servo, with the result that the vehicle starts to decelerate progressively. However, that takes place without the stress of the driver on the control piston varying during the travel of the latter. The command therefore takes place by varying the travel on the pedal, not by varying the force. It can thus take place at a constant force for the driver. The jump delimited by the points B and D in FIG. 35 must normally be a comfort phase, if the braking is restricted to this phase. It then corresponds to a soft and progressive braking circumstance, for example with the aim of stopping at a three-colored set of lights. There must remain for the driver a margin of travel corresponding to a following phase during which the force which he will exert will be proportional to the braking force and to the deceleration of the vehicle.

Figure 4:
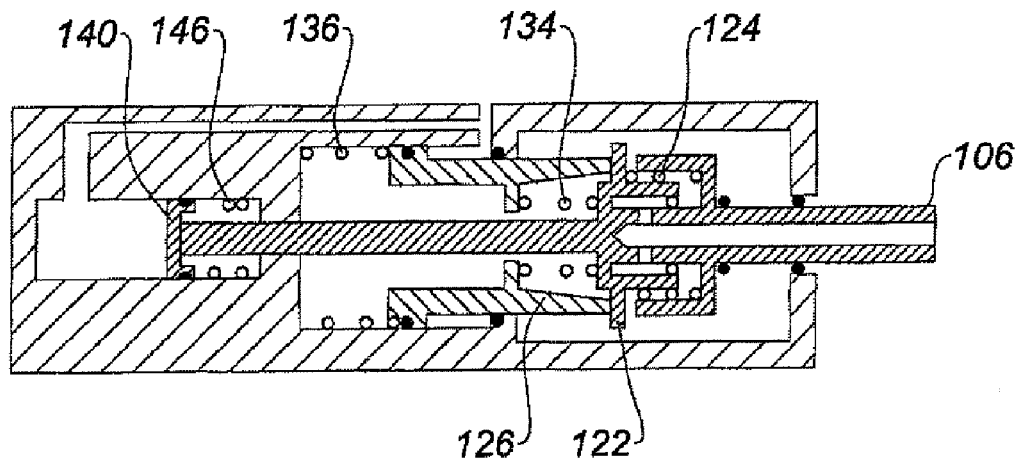

In return, the increase in this pressure is transmitted through the duct 142 as far as the reaction piston 140 which is thus urged toward the right against the jump spring 146. All this movement serves to compress the latter. The latter meets the front end of the control piston 106 in the situation shown in FIG. 4. This contact characterizes the end of the jump phase and the start of the proportional phase.

Figure 5:
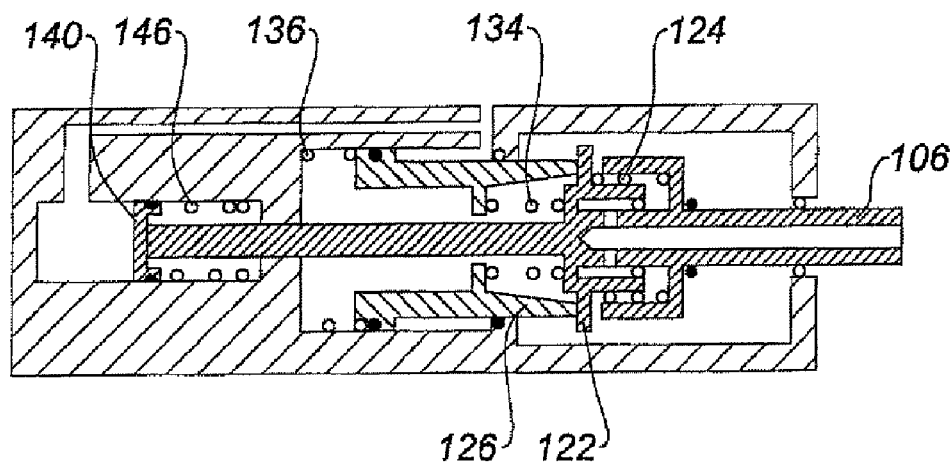

Past this point, with reference to FIG. 5 and at point E in FIG. 35, the force exerted by the driver on the control piston 106 directly opposes the pressure prevailing in the master cylinder, the control piston bearing directly against the reaction piston 140. The driver thus directly perceives the hydraulic reaction emanating from the master cylinder. From now on, he perceives a sensation corresponding to the valve spring 134 (which delivers a substantially constant force) and especially to the pressure of the master cylinder which increases proportionally to the force provided by the driver.

The end of this proportional phase corresponds to FIG. 6 and to point F. At this stage, the bush 126 has arrived at the end of its travel against the front end of the rear enclosure, with interposition of the main spring 136 which is at its maximum compression. Preferably, the simulator is arranged such that this end of travel corresponds to the saturation point of the brake servo and therefore to the end of the assistance range provided by the latter.

Specifically, in the continuation of the process, for example at point G, the control piston can move to the left through the bush 126 but this action from now on takes place without the assistance of the brake servo. The driver therefore acts alone against the pressure of the master cylinder by stressing the reaction piston. This action likewise takes place against the valve spring 134.

It will therefore be seen that the valve spring 134 moves during the jump with the moving parts without being further compressed than it is during the provision of the engagement force. Therefore, the force felt at the pedal by the driver is substantially constant during the jump phase. The driver therefore has no need to devote a large amount of energy to this phase. He can thus still provide a lot of energy if a greater degree of braking proves to be necessary. It can also be seen that, on completion of the jump, during the proportional assistance phase, the bringing of the control piston 106 into contact with the reaction piston 140 allows the driver to feel the change of the pressure in the master cylinder. He therefore perceives a reaction force proportional to the increase of the pressure in the liquid. He will also perceive, if appropriate, fluctuations in the pressure caused by a wheel anti-lock system (ABS) or a dynamic trajectory control system (ESP).

It will be observed that the choice of the cross section of the reaction piston 140 has an influence on the slope of the segment DF of the proportional assistance phase of the brake servo, that is to say on the assistance ratio provided by the latter.

Second Embodiment

We will now describe a second embodiment of the invention with reference to FIGS. 7 to 11. The second embodiment is relatively close to the preceding one. However, the simulator is this time integrated with the brake servo 250. Thus, the simulator 200 is fastened by its rear end to a rear wall 252 of the brake servo in a position which is coaxial to the latter. The casing extends entirely within the working chamber 264 of the brake servo.

As previously, the control piston 206 penetrates the casing of the simulator. In a configuration very close to that of the first embodiment, the collar 212, the valve 222, the relief 216 and the bush 226 again appear. The control piston 206 is interrupted little after passing through the bush. Moreover, it is in contact with the latter. Consequently, to allow air communication between the front 205 and rear 204 enclosures of the simulator, a duct 254 is this time formed along an internal face of the bush. This duct is parallel to the axis 208 but off-centered with respect to the latter.

The reaction piston 240 this time has an elongate shape such that it penetrates by its rear end into the front portion of the bush. It extends beyond the front end of the casing toward the front while passing through the membrane 256 of the master cylinder. It passes through a support 258 slidably mounted in the master cylinder 260 of the brake servo, represented schematically, and bearing at its rear end the mid-portion of the movable membrane 256 separating the working chamber 264 from the vacuum chamber 266 situated at the front. The reaction piston 240 is cut out along its axis along the piston and has close to its rear end two radical ducts 242 which place an internal enclosure 262 of the master cylinder extending out of the front of the reaction piston into communication with a sealed annular rear enclosure 205 of the bush. One of the ducts 242 is extended in the radial direction by passing through the bush 226 so as to open into a second annular enclosure formed between the bush and the casing, to the rear of the rim 230 of the bush. The pressurized liquid of the master cylinder can thus urge the bush toward the front.

The rear portion of the rear enclosure 204 of the simulator is connected by a duct (not shown) to the vacuum chamber 266 of the brake servo. The front portion of the rear enclosure 204 is connected by the duct 254 to the working chamber 264.

The jump spring 246 this time bears, toward the front, against the reaction piston 240 and, toward the rear, against the front end of the bush 226. Moreover, it is fitted onto the control piston and traversed by the latter.

The operation of this embodiment is similar to that of the preceding one.

Figure 7:
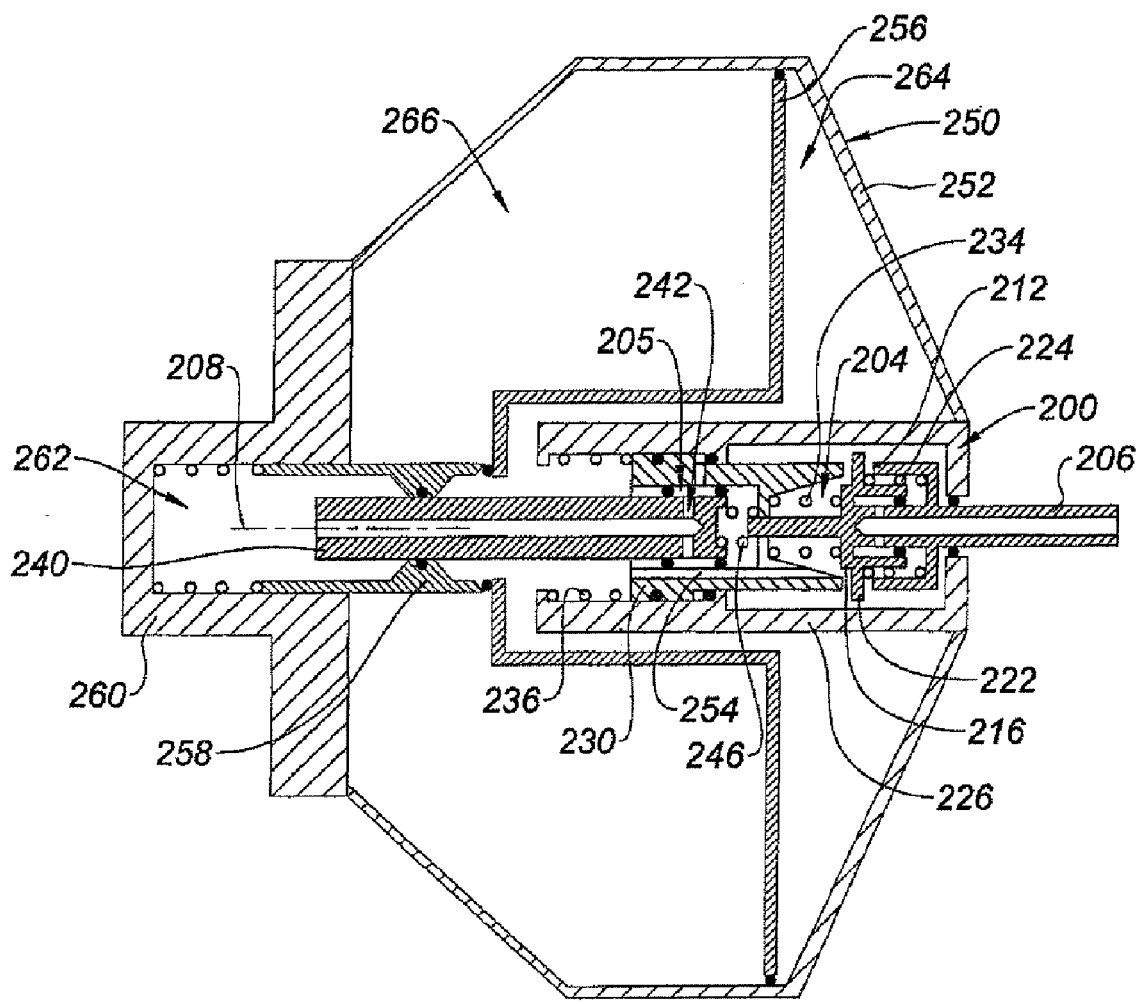
FIG. 7 illustrates in axial section a booster according to a second embodiment of the invention.
Figure 8:
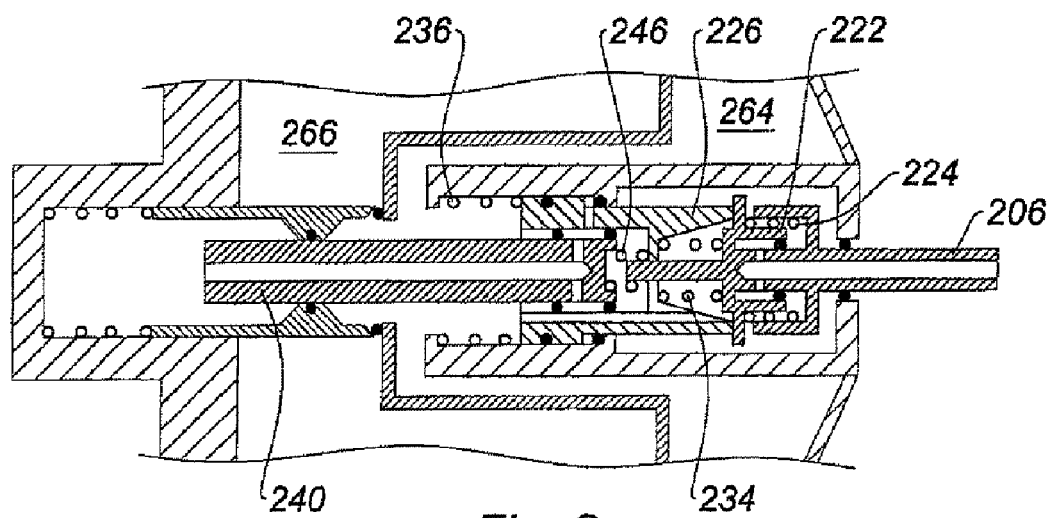
FIGS. 8 to 11 are partial views in axial section of the booster in FIG. 7 during various steps of its operation.
Figure 9:
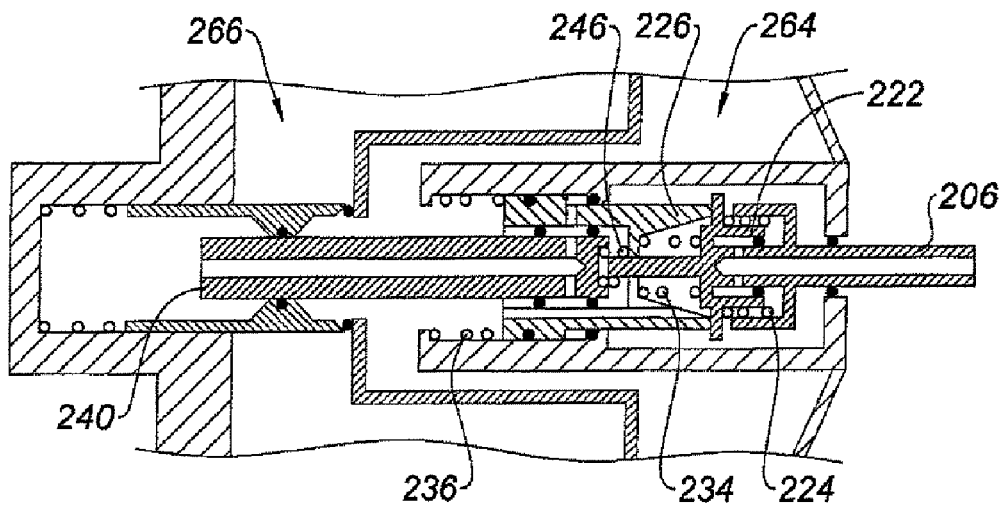

Thus, FIG. 7 represents the brake servo in the free state, in the absence of stress on the brake pedal, that is to say on the control piston 206. The valve 222 bears on the relief 216. The vacuum prevails in the front chamber 266 and the rear enclosure 204 of the simulator places the working chamber 264 of the brake servo into communication with the vacuum chamber, in particular through the duct 254 and taking account of the space existing between the bush 226 and the valve 222. We are therefore at point A in FIG. 35.

When the driver presses on the brake pedal, he moves the control piston 206 toward the left by means of an engagement force. That places the valve 222 in contact with the bush 226. We are then at point B in FIG. 35. This is the end of the compensation of the play existing between the valve and the bush and the start of the jump. At this stage, the driver has only caused the valve spring 234 to compress. The bearing of the valve 222 on the bush 226 interrupts communication between the vacuum chamber and the working chamber 264.

The continuation of the advancing movement of the control piston creates air communication through the latter between atmospheric air and the working chamber 264 via the duct 254. The working chamber therefore fills with air progressively, thereby causing the membrane 256 to move toward the front. There follows an increase of the pressure in the master cylinder. This pressure prevailing in the enclosure 262 is transmitted inside the reaction piston as far as the rear face of the front rim of the bush 226 and moves it toward the left. The valve 222 therefore follows the advancing movement of the control piston 206. We are now in the situation shown in FIG. 9 which corresponds to point C. Thus, during the jump, the assembly formed by the control piston 206, the valve 222, the bush 226 and the spring 234 moves, the valve trying to find its equilibrium during this movement.

Figure 10:
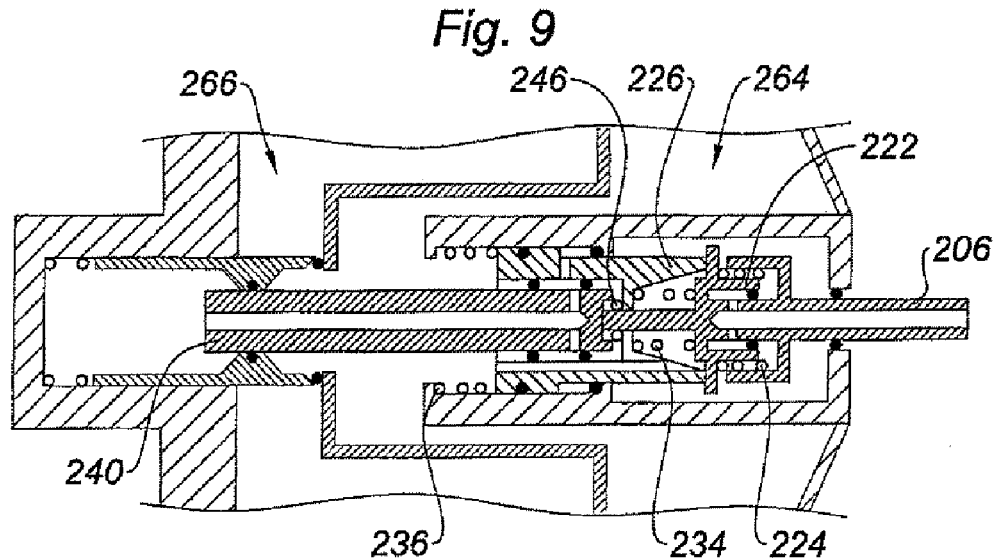

The situation in FIG. 10 at point D marks the end of the jump and the start of the proportional assistance phase. Specifically, the control piston 206 comes into direct contact with the rear end of the reaction piston 240.

Figure 11:
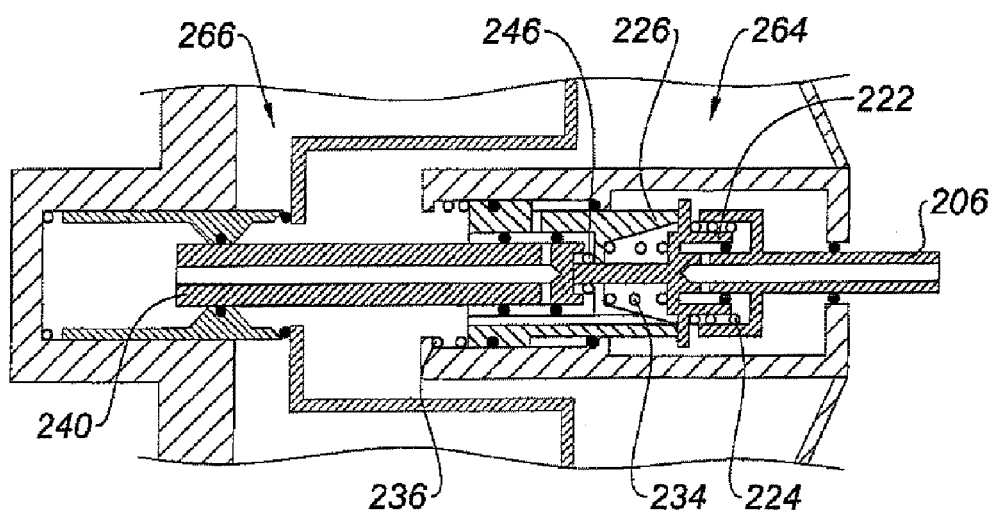

During the continuation of the advancing movement of the control piston, for example when we pass into the situation in FIG. 11 at point E, the stress felt by the driver has been transmitted from the brake liquid by the reaction piston 240.

This embodiment makes it possible to lower the manufacturing costs. Specifically, it does not require the provision of an air transmission duct between the simulator and the working chamber 264 of the brake servo. It also increases the efficiency of the braking system by reducing its response time.

Third Embodiment

A third embodiment of the invention is illustrated in FIGS. 12 to 15.

Again, it is only the simulator 300 which has been illustrated in these figures. The main modification with respect to the first embodiment consists in the replacement of the jump spring 146 by a reaction disk 346 made of elastic material, for example rubber.

As previously, the control piston 306, the valve 322, the bush 326 and the valve spring 334 appear again. The reaction piston 340 is this time housed directly inside the bush 326. For this purpose, the latter is closed off in its front portion by a plug 360 which, before being positioned, made it possible to introduce into the bush first of all the reaction disk 346 and then the piston 340. The bush with the plug 360 constitutes, once the latter is in place, a rigid assembly in one piece. The main spring or travel-pressure spring 336 bears, on the one hand, against a front face of the plug 360 and, on the other hand, against the internal rear face of the front wall of the casing 302. The radial duct 342 places in communication with the liquid of the master cylinder an internal cavity of the bush extending between the plug 360 and a front face of the piston 340. To this end, the duct extends into the bush in itself by a radial portion 362. This duct 342 thus places in communication with this liquid an annular cavity 343 delimited at the front by a rear face of the rim of the bush.

Figure 12:
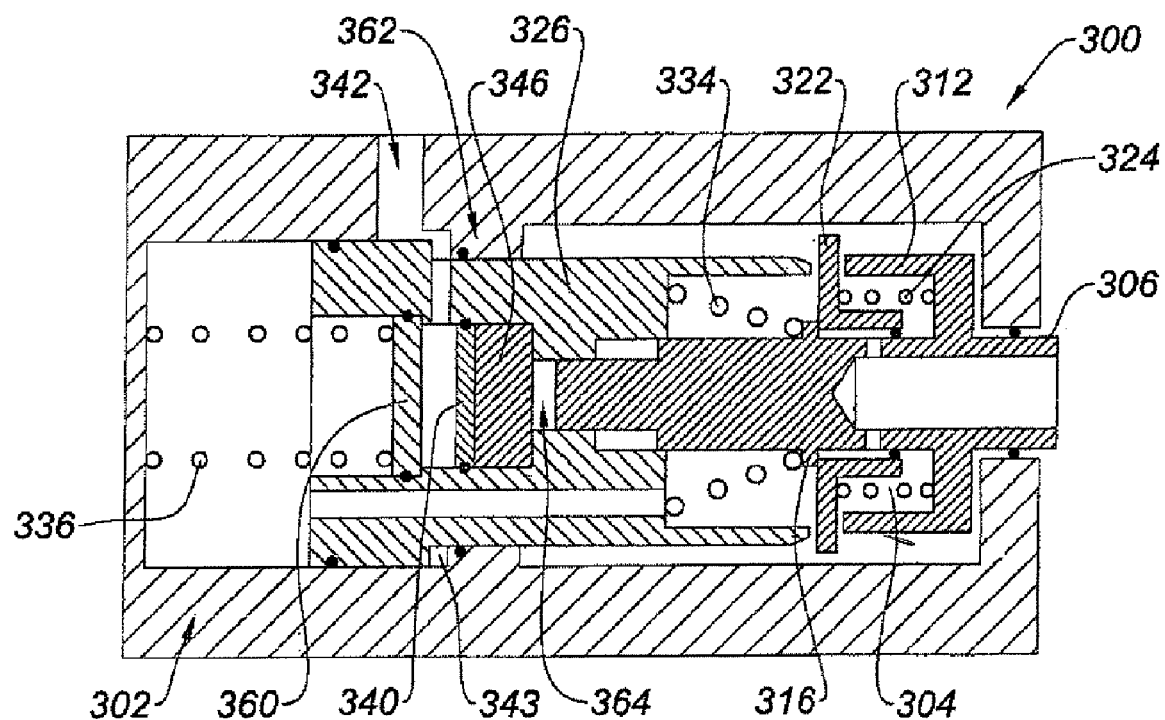
FIGS. 12 to 15 are analogous views to FIGS. 1 to 4 illustrating a simulator according to a third embodiment of the invention.
Figure 13:
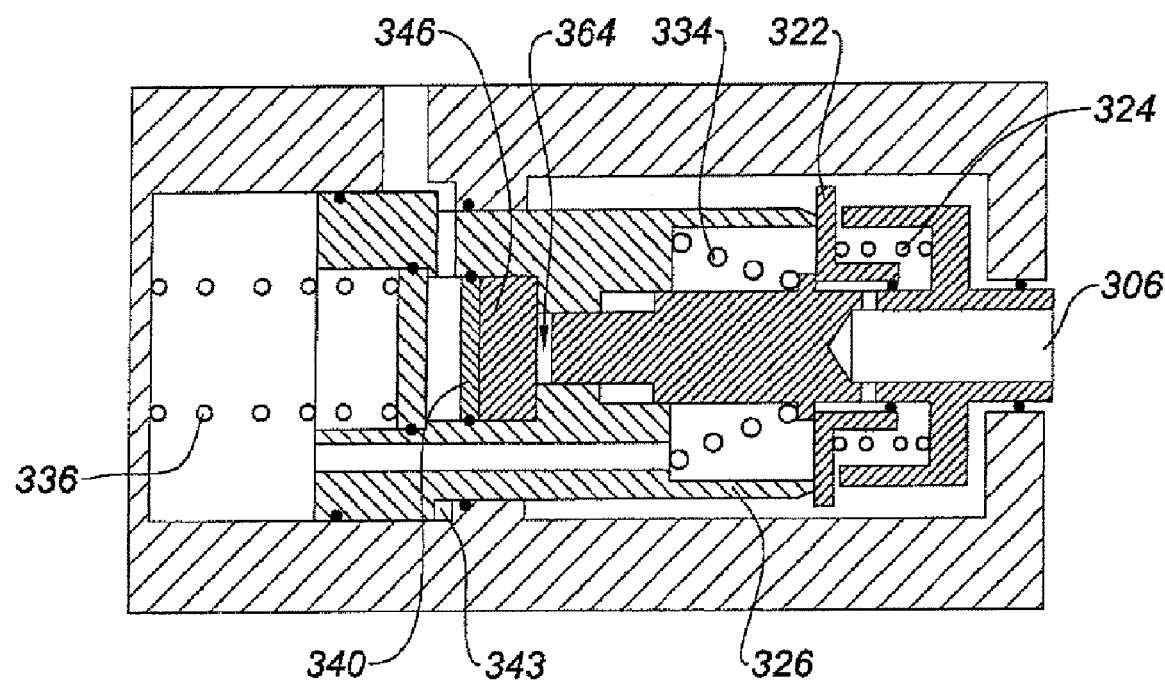
Figure 14:
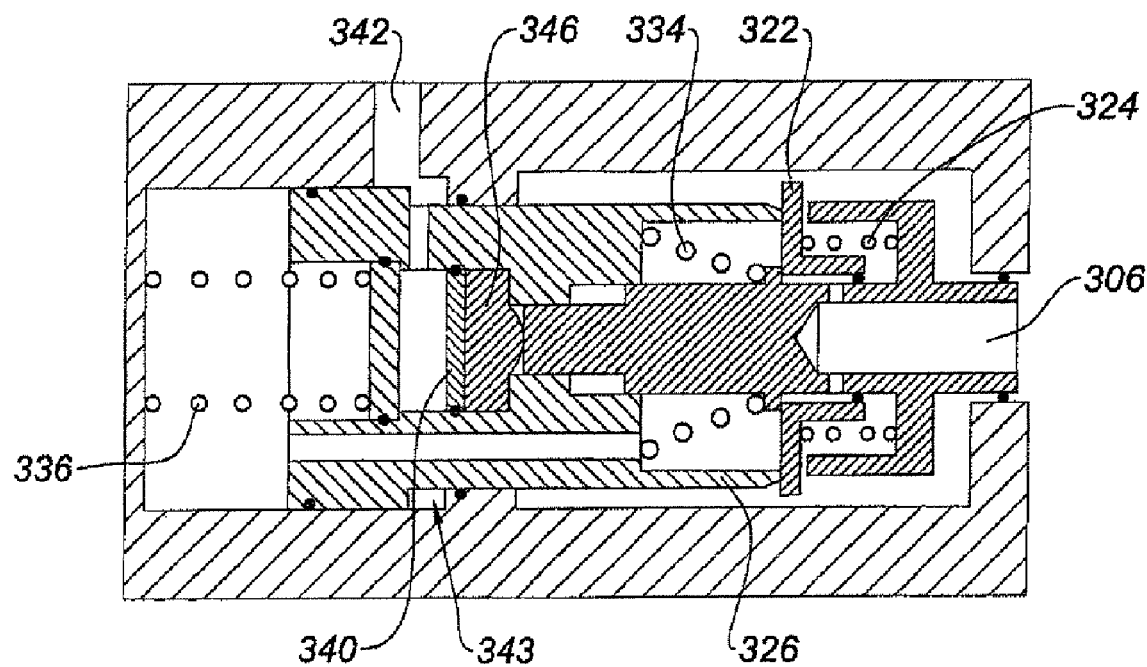
Figure 15:
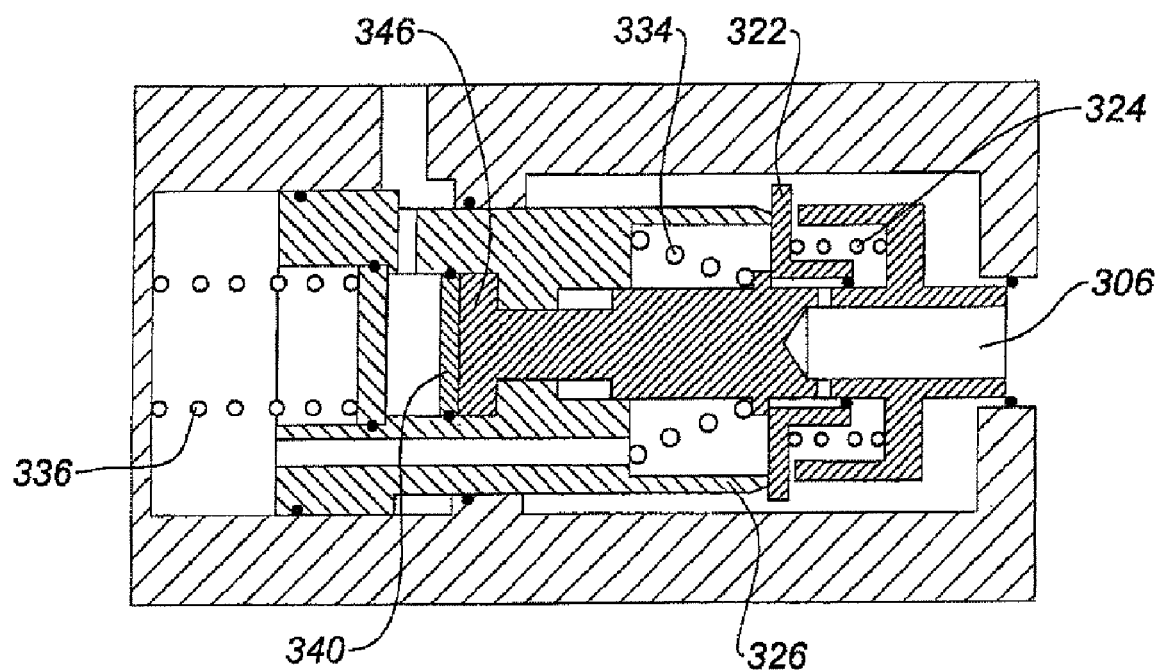

FIG. 12 represents the simulator in the free state. The valve 322 bears against the relief 316 but at a distance from the bush 326. The simulator places the working chamber of the brake servo in communication with its vacuum chamber. The pressure in the master cylinder is low such that the disk 346 is not deformed. We are at point A in FIG. 35.

When the driver actuates the brake pedal, he moves the control piston 306 toward the left until bringing the valve 322 into contact with the bush 326. We are in the situation in FIG. 13 and at point B of FIG. 35 marking the end of the provision of the engagement force and the start of the jump. The contact between the valve and the bush interrupts the communication between the vacuum chamber and the working chamber of the brake servo.

The continuation of the movement of the control piston 306 creates an atmospheric air passage between the latter and the valve, thereby actuating the brake servo and causing an increase in the liquid pressure in the master cylinder. This pressure is transmitted to the bush via the ducts 342 and 362, and is exerted toward the front in the annular cavity 343 so as to move said bush toward the left in FIG. 12. The control piston therefore moves with the valve and the bush toward the front.

The pressure prevailing in the master cylinder is also exerted against the reaction piston and on the elastic disk 346 which starts to expand so as to fill a space 364 delimited at the front by the elastic disk and at the rear by the front end of the control piston. The end of the jump in FIG. 14 and at point D in FIG. 35 corresponds to bringing the deformed disk into contact with the control piston 306.

From this moment, an additional force by the driver on the control piston is exerted against the reaction disk 346 and against the pressure prevailing in the master cylinder felt by the driver. Thus, in FIG. 15 which corresponds to point E in FIG. 35, we find ourselves during the assistance phase. The increasing pressure which prevails in the master cylinder is transmitted by the reaction piston and the elastic disk to the control piston and therefore perceived by the driver.

The continuation of the operation is the same as in the preceding embodiments.

It will be observed that the elastic reaction disk 346 is situated inside the simulator and exposed to the pressure prevailing in the master cylinder.

Here too, the choice of the cross section of the reaction piston makes it possible to determine the assistance ratio that it is desired to obtain over the proportional assistance segment DF in FIG. 35.

Fourth Embodiment

We will now describe with reference to FIGS. 16 to 34 a fourth embodiment of the invention.

Figure 16:
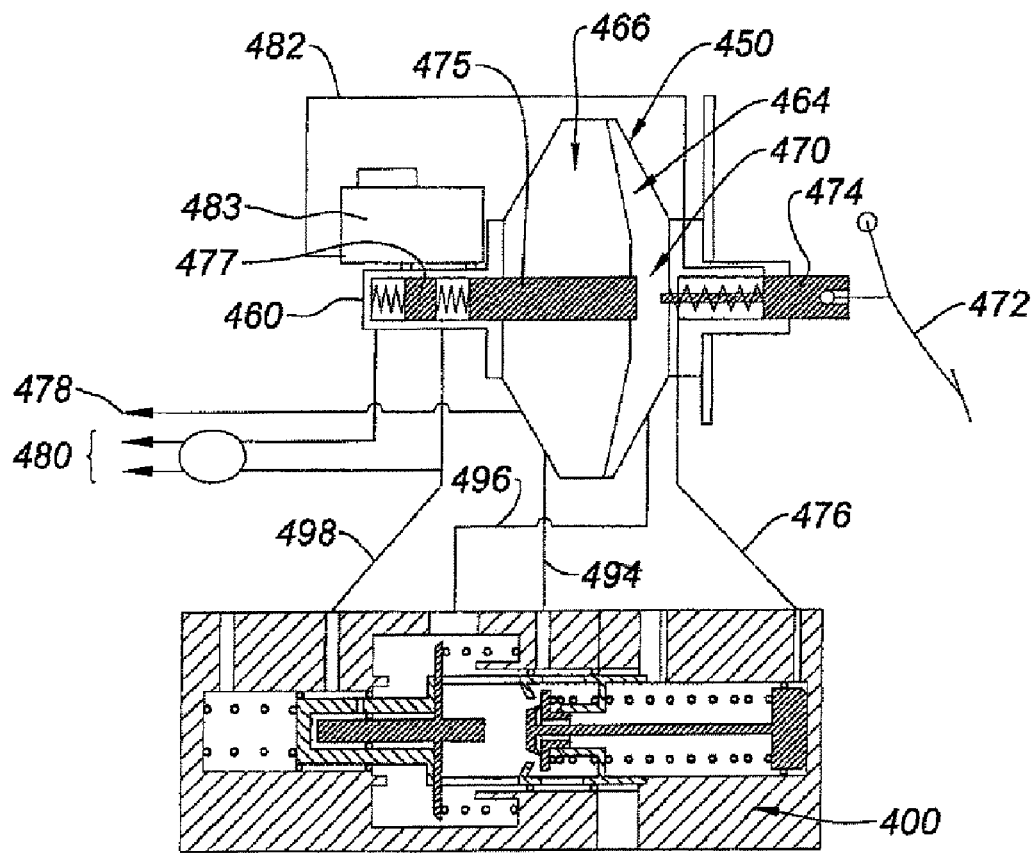
FIG. 16 is a view of a braking system according to a fourth embodiment of the invention.

FIG. 16 illustrates an overall view of the system in which the simulator 400 of this fourth embodiment is incorporated. In this embodiment, the system comprises a hydraulic control braking device 470 integrated coaxially with the brake servo 450. The brake pedal 472, or any analogous member, which is used by the driver to command the braking is connected to a control rod 474 mounted slidably with respect to the casing of the brake servo along the axis of the latter. The rod penetrates within the working chamber 464 and has an end which is, at rest, at a distance from a push rod 475 of the master cylinder 460. This arrangement makes it possible, in the event of failure of the simulator 400 or of the brake servo 450 as will be seen below, to exert a pressure from the control rod 474 directly on the rod 475. The rod 474, controlled by the brake pedal, is able to place under fluid pressure a chamber of the hydraulic control device which transmits this pressure into a duct 476 opening in the simulator 400 upstream of the control piston. A duct 482 starting from a liquid reservoir 483 makes it possible to supply the inside of the control device 470 with braking liquid.

The simulator 400 receives the pressure thus injected and makes it possible, according to the position of the piston, to control the operation of the brake booster, as will be seen further on.

The device comprises a depression source 478 for creating the vacuum in the vacuum chamber 466 of the brake servo. The master cylinder 460 comprises two pistons 475 and 477, the first being likened to the rod 475 for greater simplicity. Hydraulic braking circuits 480 make it possible to retransmit the braking pressure to the brake members of the vehicle wheels.

For further details on the elements other than the simulator 400, reference may be made to document FR-2 895 958.

In the present example, the control piston 406 is housed wholly inside the casing 402 of the simulator 400. At its rear end, it has a feeler 484 which is exposed at its rear face to the liquid pressure coming from the duct 476. The relief of the control piston is formed by a stop 416 at the front end of the piston. The feeler 484 and the stop 416 are connected to one another by a rod onto which the valve 422 is fitted.

The latter can bear sometimes against the stop 416 and sometimes against a collar 412 of the bush 426, extending behind the valve. The bush additionally comprises a relief 486 extending opposite the front face of the valve, on the same side therefore as the stop 416 and against which the valve can also bear.

The valve spring 434 bears toward the rear against the feeler 484 and toward the front against the base of the collar 412.

Figure 17:
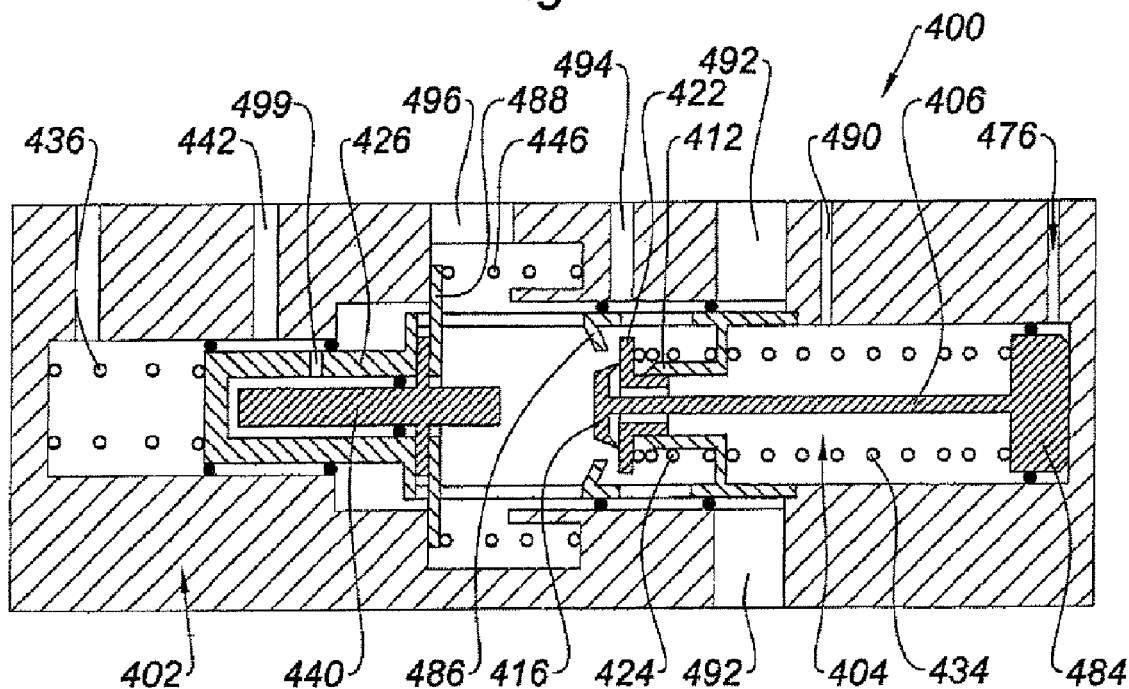
FIG. 17 is a view in axial section on a larger scale of the simulator of the system in FIG. 16.

The valve spring 424, as above, bears toward the rear against this collar and toward the front against the valve 422 so as to urge the latter to bear on the stop 416 at rest as in FIG. 17.

The jump spring 446 bears toward the rear against a face of the casing 402 and toward the front against a movable washer 488.

The latter is traversed in its centre by a rear end of the reaction piston 440 which has a shoulder via which it butts toward the rear against a front face of the washer 488. The piston 440 has a front end fitted into the front end of the bush 426, which bush penetrates a front enclosure 405 of the casing 402.

The casing has a first radial duct 490 placing the outside of the casing at atmospheric air into communication with the rear enclosure 404 in front of the feeler 484. The casing has at least a second radical duct 492 and in this case two ducts, each able to open likewise in front of the feeler so as to place the rear enclosure in communication with the atmospheric air. Unlike the duct 490, the ducts 492 do not produce this communication permanently. Thus, at rest as in FIG. 17, the rear end of the bush 426 shuts off these ducts. Furthermore, these ducts have a main cross section very much greater than that of the duct 490 and therefore allow a higher air flow rate.

The casing has a radial duct 494 placing a central region of the rear enclosure 404, occupied by the valve 422 and situated between the collar 412 and the relief 486, into communication with the vacuum chamber 466 of the brake servo itself connected to the vacuum source 478.

The casing also comprises a radical duct 496 opening into the enclosure 404, between the stop 416 and the washer 488, so as to place it in communication with the working chamber 464 of the brake servo.

Orifices are also provided in the bush in line with the duct 496 and in line with the collar 412.

Another radial duct 442 of the casing places a front internal enclosure of the bush in which the reaction piston 440 is situated into communication with the primary pressure prevailing in the master cylinder. For this purpose, an orifice 499 passes radially through the wall of the bush.

FIG. 17 illustrates the simulator at rest, in the absence therefore of the actuation of the pedal 472. The feeler 484 butts against the rear end of the casing. The valve 422 bears against the front stop 416. The washer 488 butts toward the front against the casing 402. The reaction piston 440 butts toward the rear against the disk. The bush butts toward the rear both against the casing at the rear of the latter, in the region of a shoulder situated between the ducts 490 and 492, and against the reaction piston 440. Communication is therefore established from the duct 494 via the bush in front of the valve up to the duct 496. The vacuum chamber and the working chamber are therefore at the same pressure. There is no pressure in the master cylinder. We are now at point A in FIG. 35.

An explanation will be given first of all with reference to FIGS. 18 to 23 of the operation of the simulator when the command sent by the driver is such that the jump takes place almost completely and then the pressure drops again, the command being interrupted.

Figure 18:
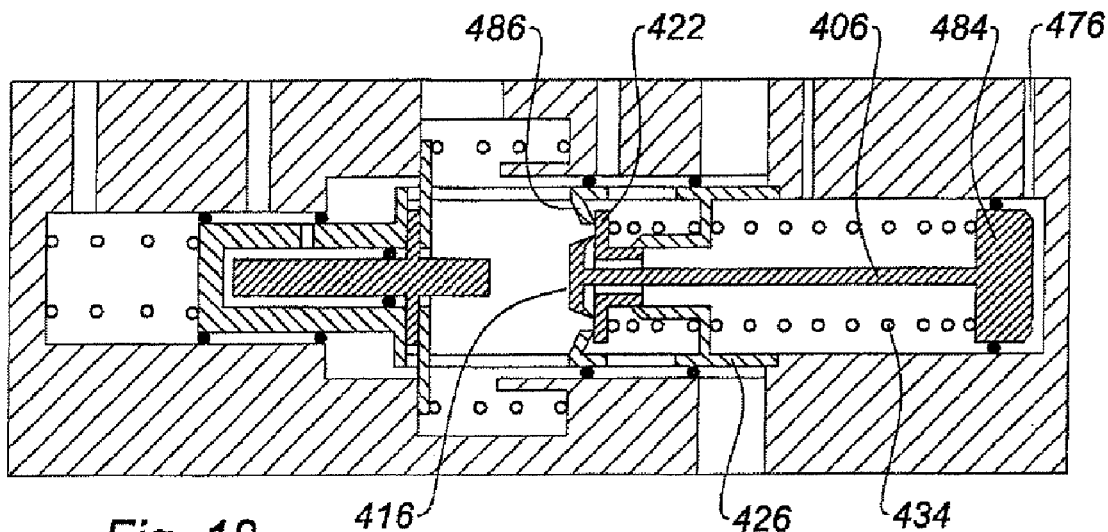
FIGS. 18 to 34 are analogous views to FIG. 17 illustrating various stages of the operation of the simulator.

With reference to FIG. 18, the sending of the command by means of the pedal 478 causes the liquid pressure to increase upstream of the feeler 484, thereby moving the control piston 406 toward the front and placing the valve 422 in contact with the relief 486. The working chamber 464 is therefore isolated with respect to the vacuum chamber. We are then at point B.

Figure 19:
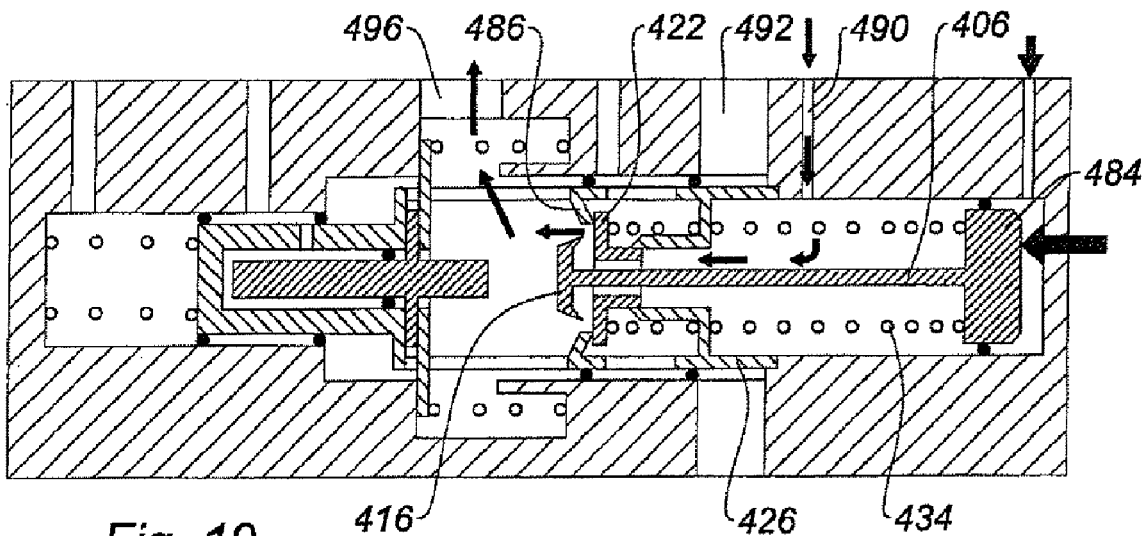

In FIG. 19, the continuation of the movement of the control piston 406, under the effect of the pressure which increases to the rear of the feeler, causes the stop 416 to separate, which stop moves away toward the front with regard to the valve. Air communication is then established between the atmospheric air arriving through the duct 490 between the rod of the control piston and the valve, and then between the stop 416 and the valve and finally between the stop and the shoulder 486. The air can then escape as far as the duct 496 and arrive in the working chamber 464. On account of the small cross section of the duct 490, it is a low air flow rate which passes at this stage.

Figure 20:
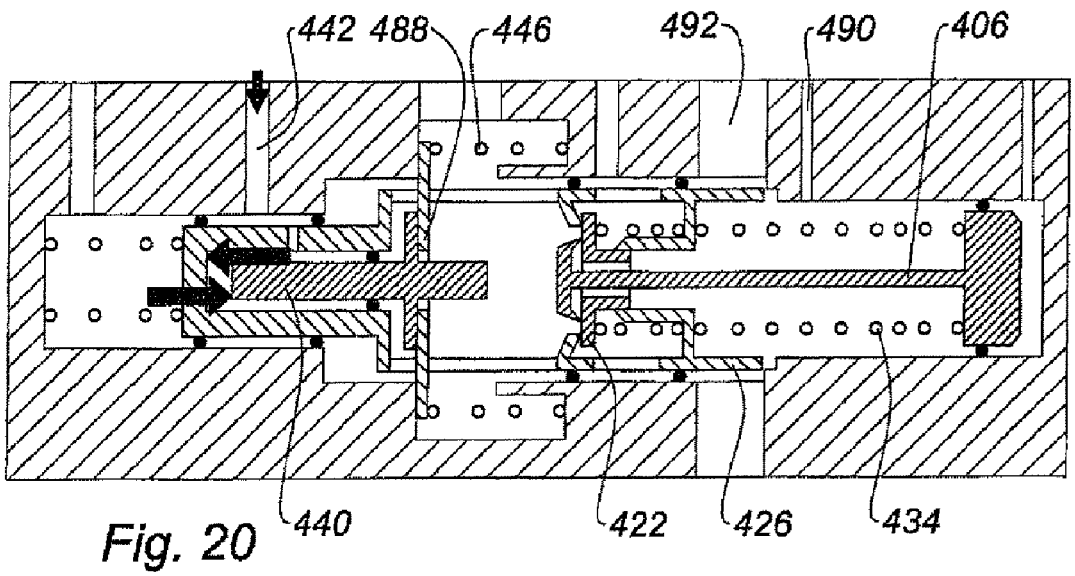

The membrane of the brake servo therefore starts to move slowly, thus increasing the pressure in the master cylinder. This pressure is transmitted to the simulator by the duct 422, as illustrated in FIG. 20. Through the bush 426, it is transmitted to the reaction piston 440, but the latter remains blocked by the jump spring 446 which still immobilizes the washer 488. This pressure is also transmitted to the bush while urging it toward the front. The advancing movement of the bush enables the valve 422 to catch up with its seat formed by the stop 416, thereby blocking the air communication which had just been established. Moreover, the bush has still advanced too little to free the ducts 492.

With the driver continuing to stress the control piston, the same phenomenon continues in an analogous manner to what has been described in the preceding embodiment. The valve thus moves with the other parts while seeking its equilibrium. At this stage, we are therefore at a point situated between points B and C in FIG. 35, the jump having been started. The movement of the control piston 406, the bush 426, the valve 422 and the valve spring 434 takes place without the latter being further compressed, as already explained. Here too, it therefore has its floating character.

Figure 21:
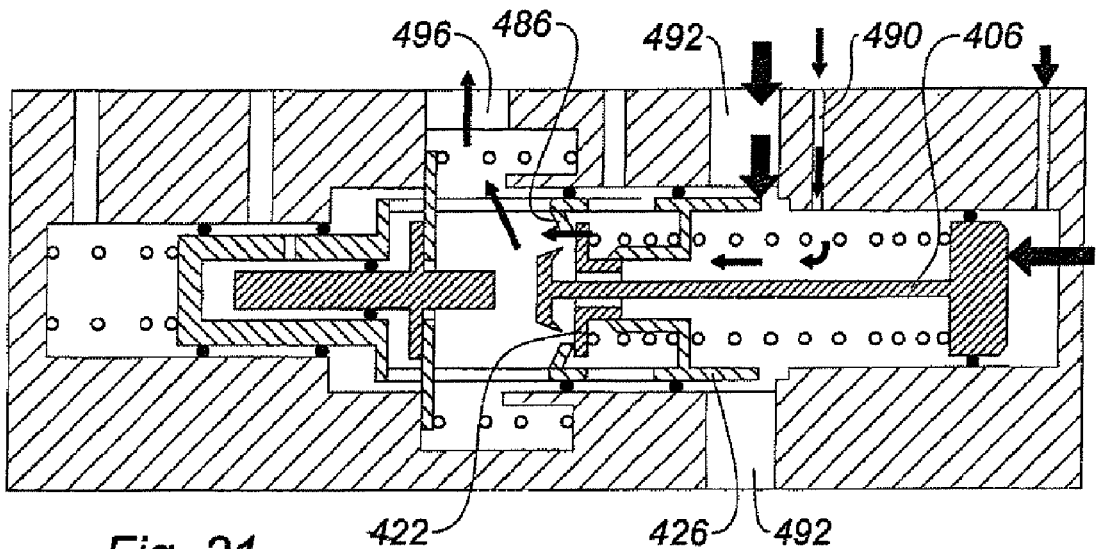
Figure 22:
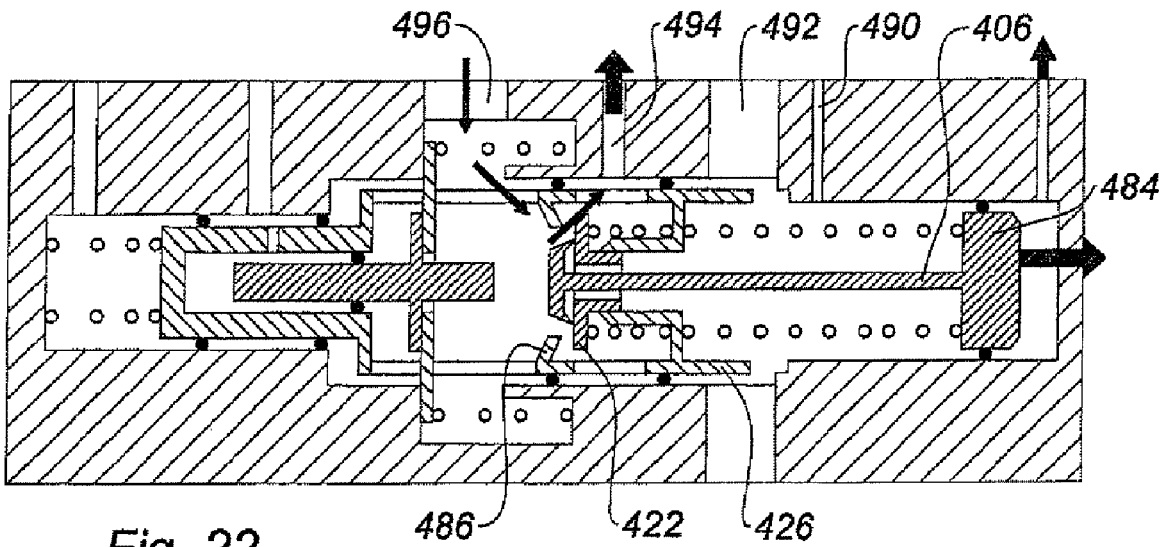

In FIG. 21, the bush has advanced to such an extent that it has placed the duct 492 in communication with the duct 496. The air flow rate can therefore now be higher in the direction of the working chamber. Moreover, the air still passes through the duct 490 opened first. The membrane moves more rapidly and increases the pressure in the master cylinder more quickly, thereby accelerating the movement of these parts.

However, it is assumed here that the driver interrupts the braking command such that the jump does not take place completely. Thus, we do not reach point D. The interruption of this command has been illustrated in FIG. 22. The drop in the pressure upstream of the feeler 484 causes a retreat of the control piston 406 which takes along the valve 422. The contact between the stop 416 and the valve interrupts the air communication between the duct 496 and the atmospheric air of the ducts 492 and 490.

Furthermore, the valve moves away from the relief 486. The space thus formed between them places the duct 496 in communication with the duct 494. In other words, the working chamber is placed in air communication with the vacuum chamber and is therefore placed at the same pressure. It is evacuated of its air and the pressure in the master cylinder decreases, thus causing the progressive retreat of the bush with the other parts. Here too, this retreat takes place without the valve spring 434 having its length modified such that the driver feels a constant force at the pedal. In the same way as for the movement of the assembly toward the front during the braking action, the movement toward the rear of the assembly once braking has been interrupted takes place while the valve seeks its equilibrium, the valve bearing sometimes on the stop 416 and sometimes on the relief 486.

Figure 23:
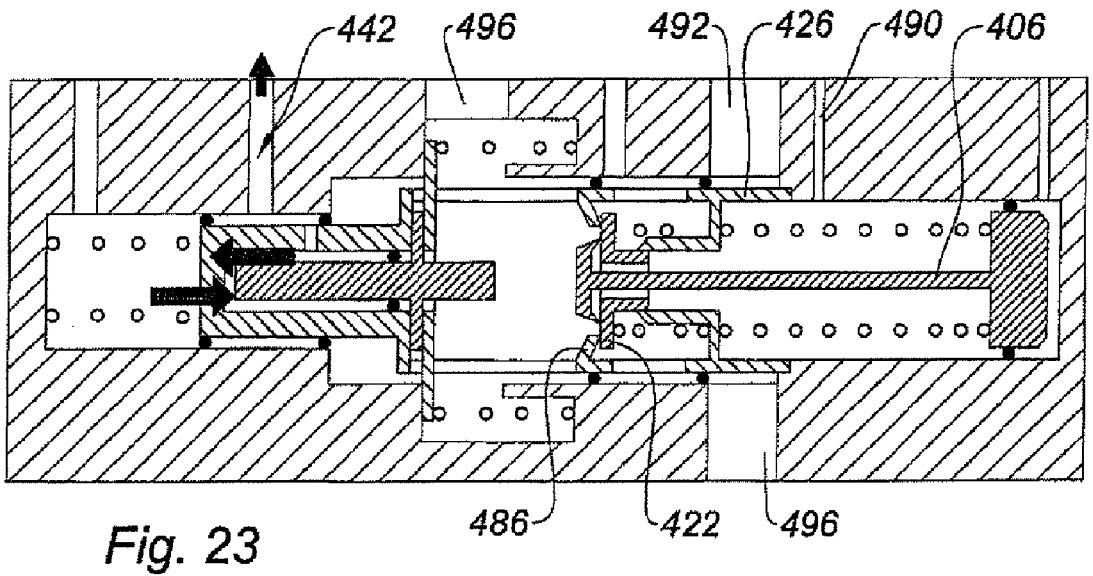

In FIG. 23, the bush finally returns to bear against the shoulder, marking its end of travel toward the rear and the return to point B before the return to point A.

A second mode of operation of the simulator will now be described with reference to FIGS. 24 to 30. What is involved this time is a full braking, namely a braking which is commanded up to reaching at least the proportional assistance phase.

Figure 24:
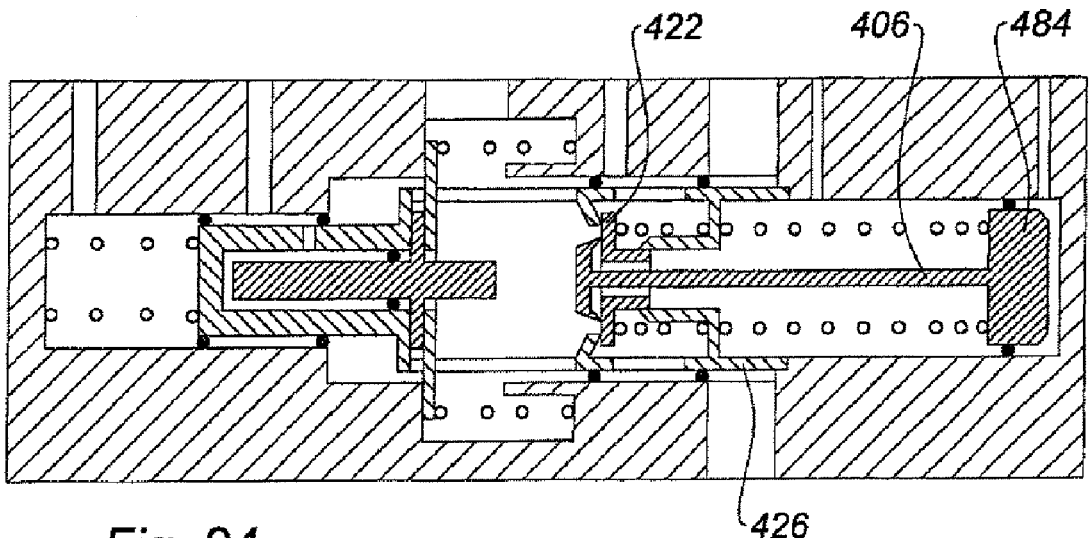

In FIG. 24, at point B, it is assumed here that the driver has just started the braking command, the feeler 484 being slightly distant from the rear face of the casing.

Figure 25:
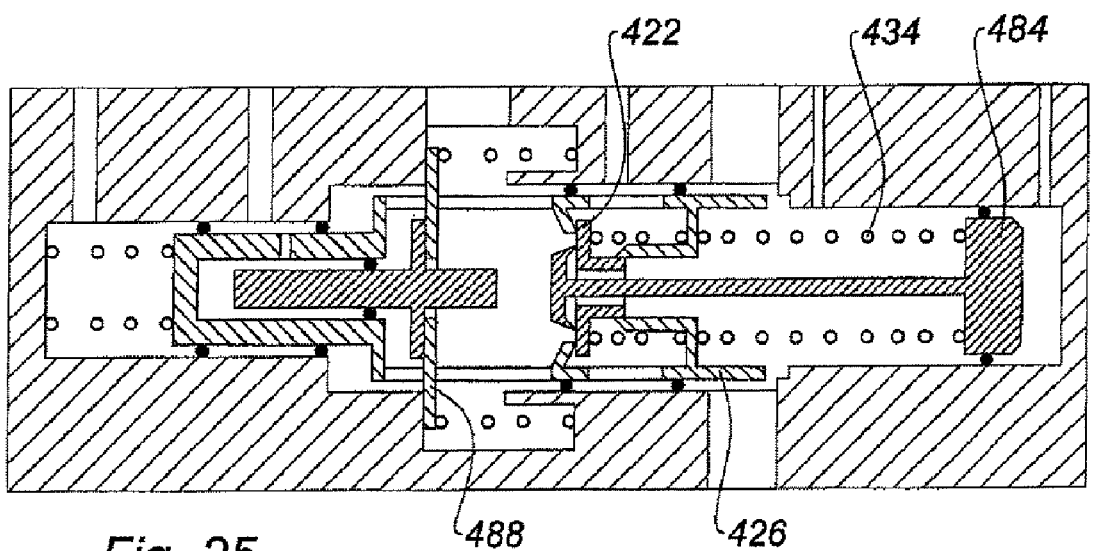

In FIG. 25, the control piston 406, the bush 426, the valve 422 and the valve spring 434 have been moved toward the left during a part of the jump as explained above. However, the point reached during the preceding description has now been exceeded.

Figure 26:
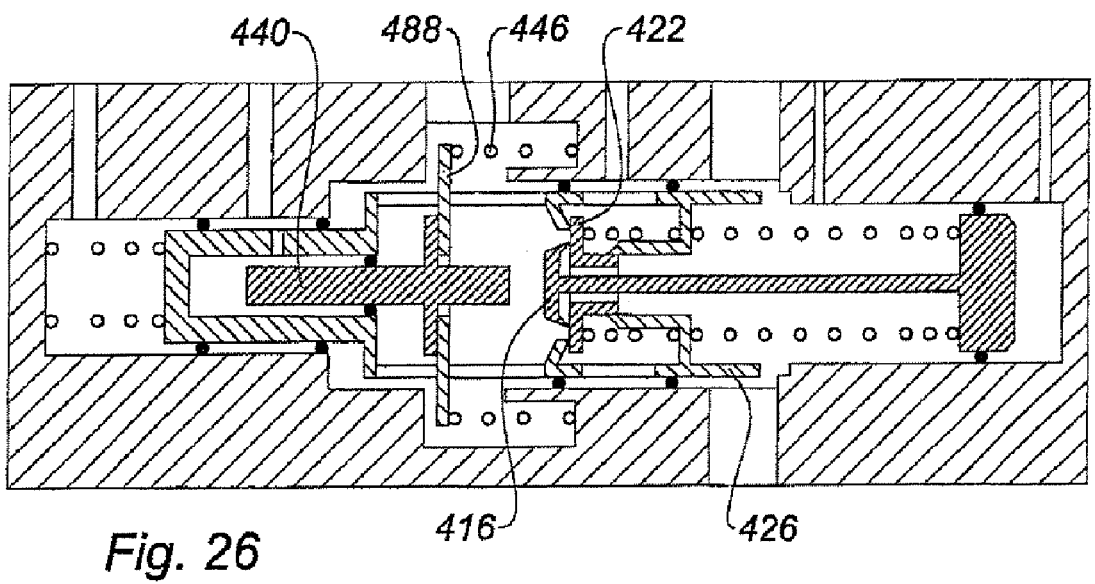

Thus, in FIG. 26, the pressure in the master cylinder has increased to such an extent that the stress that it exerts on the reaction piston 440 now allows it to overcome the force of the jump spring 446 which during the jump maintained the washer 488 bearing toward the front against the casing. Thus, at this stage, not only does the bush 426 move toward the left but the reaction piston 440 moves toward the right in the direction of the stop 416, taking along the disk 488.

Figure 27:
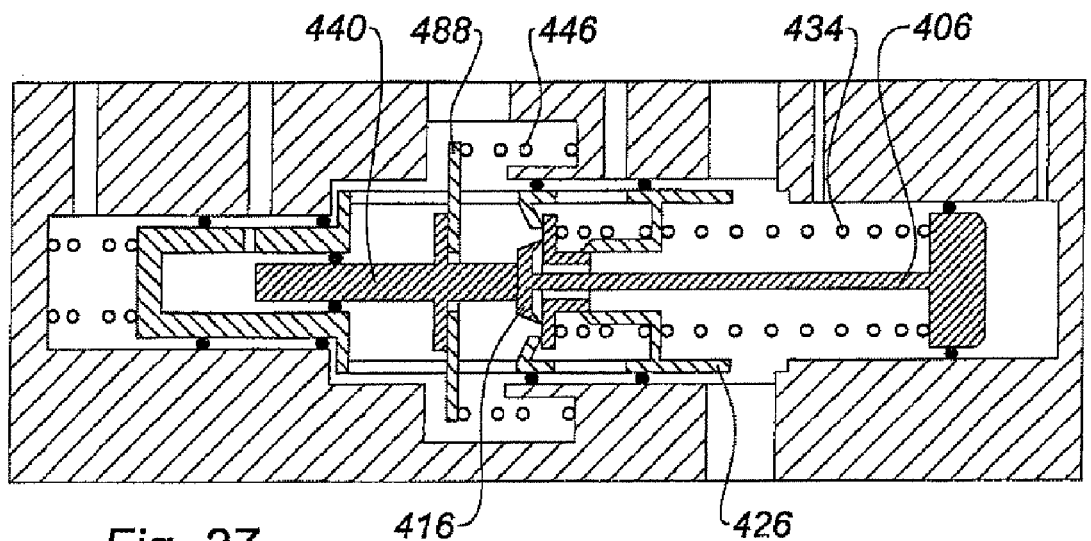

This movement continues until the stage illustrated in FIG. 27 in which the rear end of the reaction piston 440 comes into contact with the stop 416 of the control piston 406. This stage marks the end of the jump at point D in FIG. 35 and the start of the proportional assistance. From now on, the continuation of the actuation of the brake pedal by the driver will allow him to feel not only the constant force provided by the valve spring 434 but also the pressure which increases in the master cylinder. He will therefore feel a force approximately proportional to that of the pressure in the master cylinder.

Figure 28:
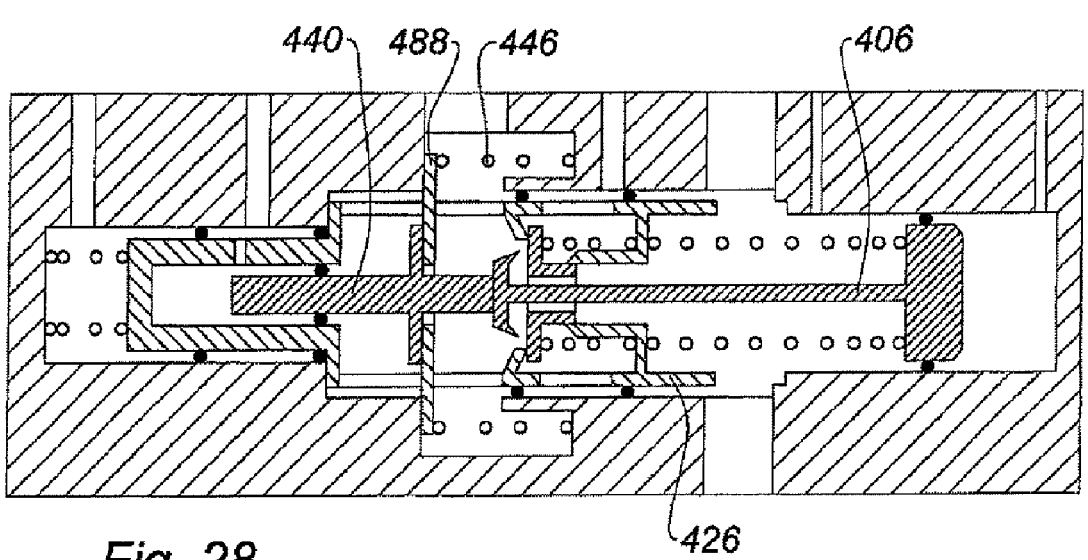
Figure 29:
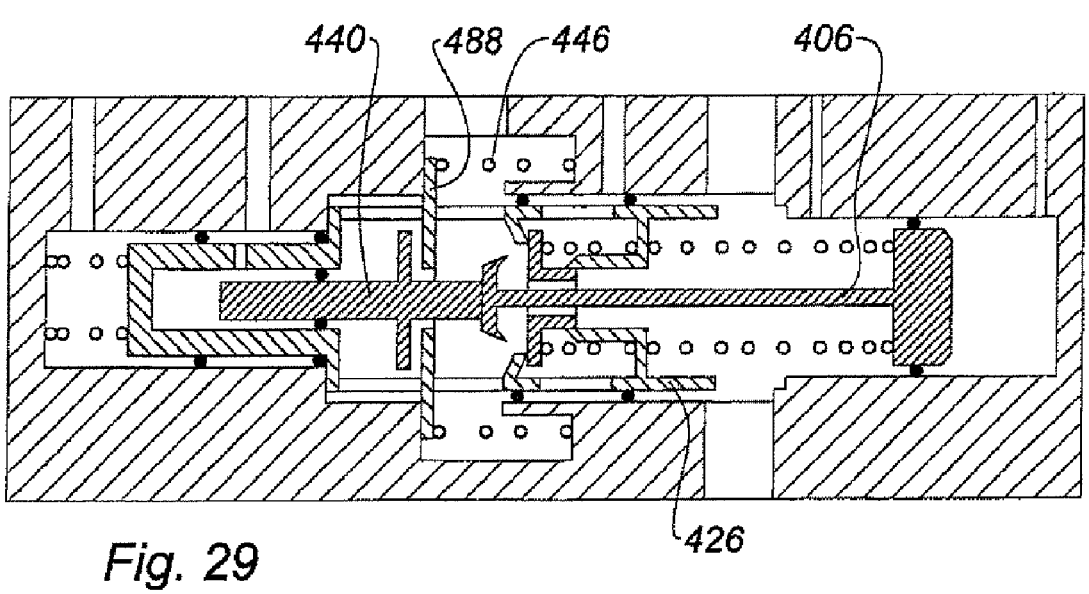

The bush 426 continues its movement toward the front until butting against the casing, as illustrated in FIG. 28. This end of travel point is chosen such that it corresponds to the saturation of the brake servo, that is to say to point F in FIG. 35. That means that the continuation of the braking will take place under the effect of only the force provided by the driver, the brake servo no longer being able to provide assistance.

Shortly after, the continuation of the movement toward the left of the control piston 406, which now directly pushes the reaction piston 440, causes the washer 488 to return against its stop toward the front. The action of the driver against the pressure of the master cylinder is assisted in that by the jump spring 446 which urges the reaction piston 440 toward the front. We are at point G in FIG. 35.

The continuation of the movement takes place without this assistance. As can be seen from FIG. 29, the reaction piston 440 thus separates from the washer 488 in its movement toward the front. We are at point H in FIG. 35.

Figure 30:
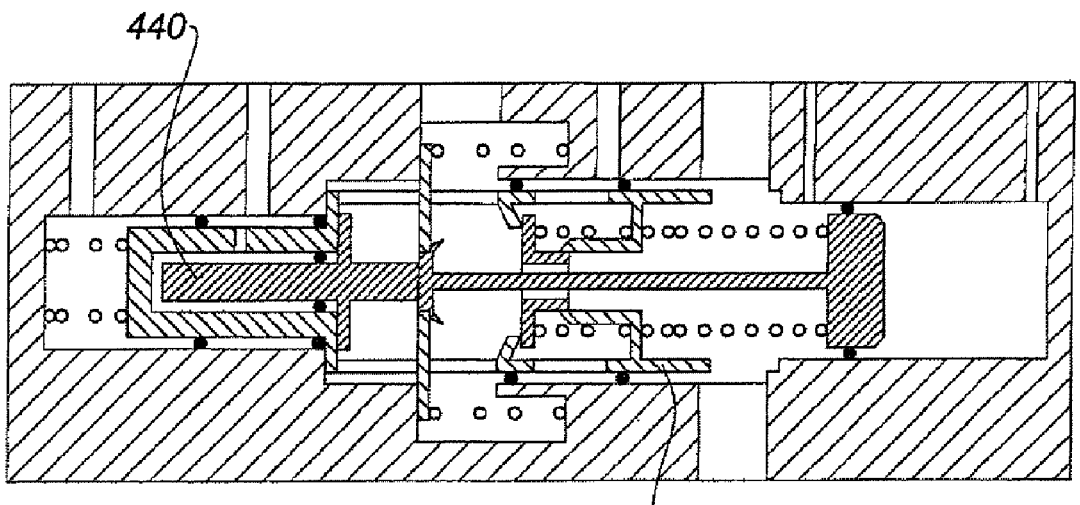

In FIG. 30, the reaction piston 440 finally arrives at a stop itself toward the front against the bush 426, thus marking the maximum travel of the parts of the simulator toward the front. We are then at point I in FIG. 35.

We will finally describe with reference to FIGS. 31 to 34 an operating circumstance which constitutes a degraded mode. It is thus assumed that the vacuum source, which is faulty, no longer provides any vacuum. Atmospheric pressure therefore prevails in the two chambers of the brake servo, which cannot provide any assistance.

Figure 31:
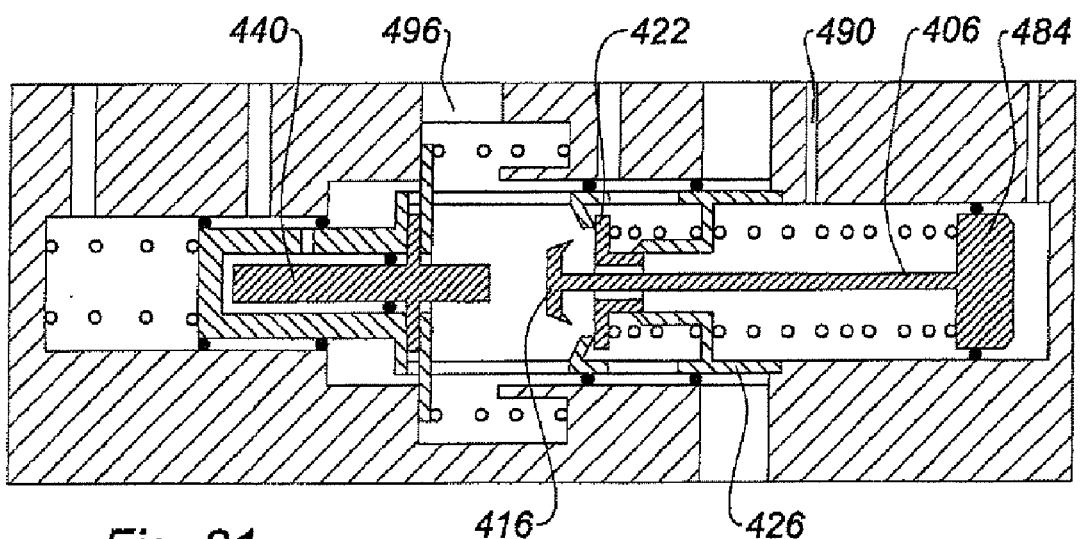

Thus, it is assumed in FIG. 31 that the driver actuates the control piston 406 to command the braking. The increase in the pressure to the right of the feeler 484 causes the stop 416 to separate with regard to the valve 422. That places the ducts 496 and 490 in communication but leads to no effect at the brake servo and on the pressure in the master cylinder.

The driver actuates the pedal until bringing the rod 474 of the control device into direct contact with the piston 475 of the master cylinder. He therefore compensates for the initial uncoupling play between these parts.

Figure 32:
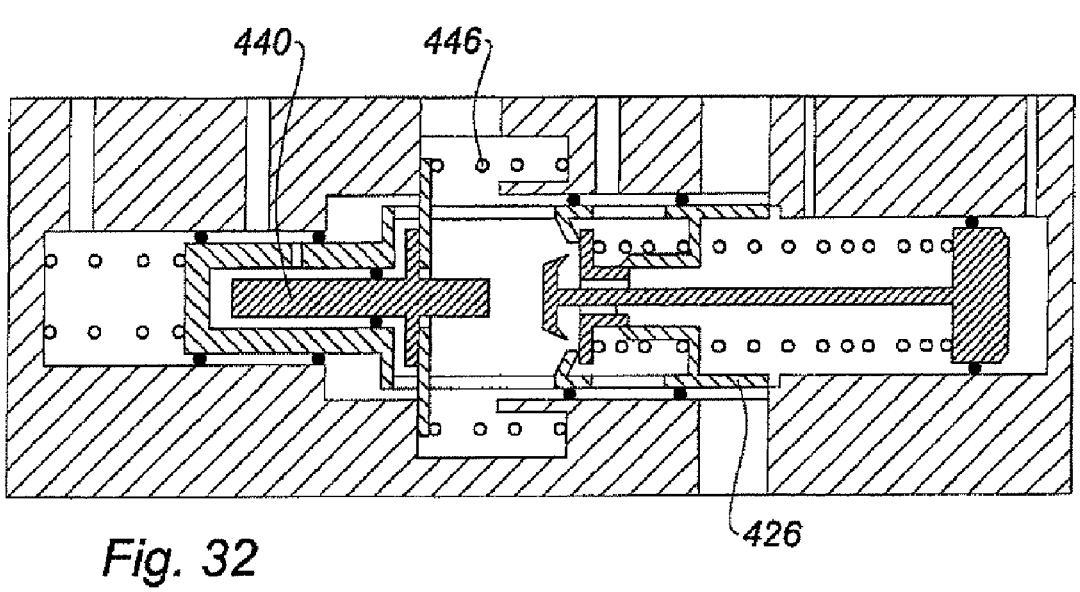

Then, the driver therefore exerts a pressure directly on the master cylinder, thus increasing the pressure in the liquid. This increase in pressure is transmitted to the front of the bush 426, inside the latter to the reaction piston 440. The jump spring 446 prevents the movement of the latter, but the increase in the pressure causes the advancing movement of the bush as illustrated in FIG. 32.

Until this stage, the advancing movement of the reaction piston has not compressed any other spring than the spring 434, which has a low stiffness. The driver has therefore preserved a fraction of his energy. The action of the driver is therefore more effective in the event of a loss of vacuum.

Figure 33:
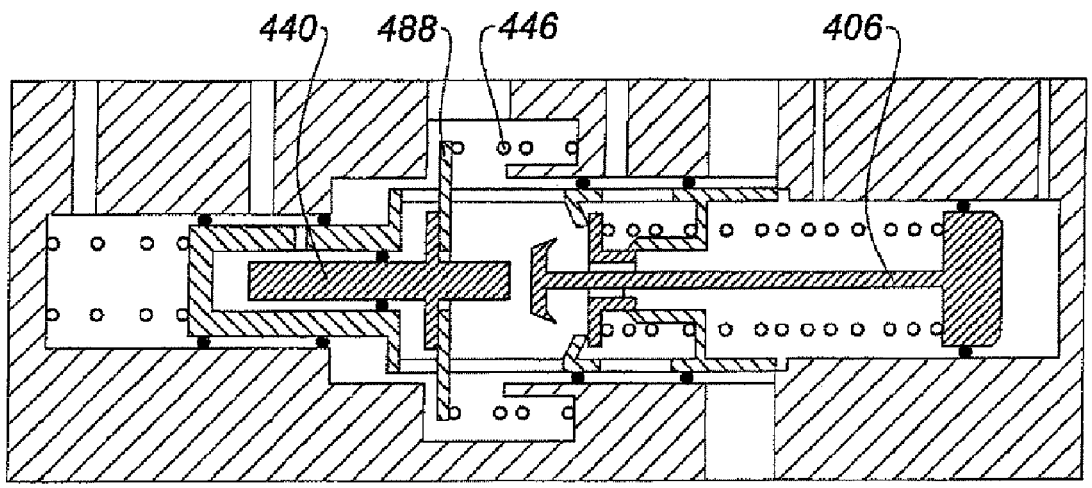

In FIG. 33, the pressure in the master cylinder has continued to increase until overcoming the resistance of the jump spring 446, thus making it possible to move the reaction piston 440 and the washer 488 toward the right.

Figure 34:
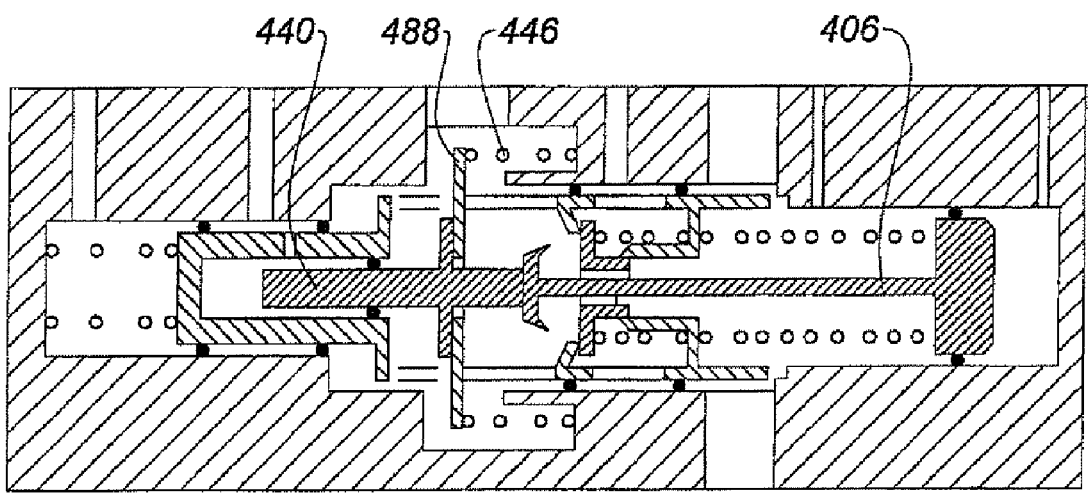

Finally, a direct contact is established in FIG. 34 between the control piston 406 and the reaction piston 440. From this stage, during the continuation of the command, the driver thus opposes, at the simulator, the pressure prevailing in the master cylinder.

Of course, numerous modifications may be made to the invention.

It will be possible to provide for the atmospheric duct 490 to have the same diameter as the or each atmospheric duct 492, its diameter being sufficient to avoid disturbances due to the transient mode. Provision may be made to close the duct 490 when the duct 492 is opened.

The invention claimed is:

1. Three-way valve simulator (100-400) for a vehicle brake servo, comprising: a control piston (106-406); and a reaction piston (140-440) remote from the control piston when the simulator is at rest, characterized in that the simulator is arranged such that the control piston, under the effect of a command transmitted from outside the simulator, is movable over a predetermined travel in the direction of the reaction piston without transmitting stress to the reaction piston, and in that the simulator is arranged such that, after movement over the predetermined travel in the direction of the reaction piston, the control piston (106-406) abuts the reaction piston (140-440) to thereafter directly transmit a stress to the reaction piston (140-440).

2. Simulator according to claim 1, which comprises a rigid slide (126-426) which is movable with respect to the control and reaction pistons and which is arranged to be stressed by the control and reaction pistons, the reaction piston (140-440) extending within the slide.

3. Simulator according to claim 2, which comprises a spring (136-436) bearing against the slide (126-426) and a casing of the simulator.

4. Simulator according to claim 1, which comprises a pre-load member (488) stressed in the direction of the reaction piston by a pre-load spring (446) when the simulator is at rest, and against which the reaction piston (440) bears in the direction of the control piston (406).

5. Simulator according to claim 4, arranged such that, when the simulator is at rest, the pre-load member (488) bears against a casing of the simulator.

6. Simulator according to claim 1, which comprises: an enclosure (104-404); three ducts each able to communicate with the enclosure; and a master cylinder duct (142-442) unable to communicate with the enclosure and arranged to transmit a fluid pressure to the reaction piston (140-440) in order to move it.

7. Simulator according to claim 1, which comprises: a working duct (496); a vacuum duct (494); and a first atmospheric duct (492), the simulator being able to place the working duct in communication optionally with the vacuum duct and with the first atmospheric duct, the simulator comprising at least a second atmospheric duct (490) and being able to place the working duct (496) in communication with the second atmospheric duct before placing the working duct in communication with the first atmospheric duct (492).

8. Simulator according to claim 1, which comprises: a casing having an enclosure (104-404) and three ducts each able to communicate directly with the enclosure; a slide (126-426) extending in the enclosure; a spring (134-434) bearing against the piston and the slide, and a master cylinder duct (142-442) arranged to transmit a fluid pressure on the slide, independently of the control piston, such that this pressure stresses the slide in the opposite direction to the control piston.

9. Braking system comprising: a control device (470); a simulator (100-400) arranged to be controlled by the control device and according to claim 1; and a brake servo (250; 450) able to be controlled by the simulator and fastened rigidly to the control device such that the control device has a configuration in which the control device stresses a master cylinder (460) fastened to the brake servo without the interposition of a fluid pressure.

\* \* \* \* \*